US008879168B1

United States Patent
Hsu et al.

(10) Patent No.: US 8,879,168 B1
(45) Date of Patent: Nov. 4, 2014

(54) IMAGE CAPTURING LENS SYSTEM, IMAGING DEVICE AND MOBILE TERMINAL

(71) Applicant: Largan Precision Co., Ltd., Taichung (TW)

(72) Inventors: Po-Lun Hsu, Taichung (TW);
Cheng-Chen Lin, Taichung (TW);
Dung-Yi Hsieh, Taichung (TW);
Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 14/073,606

(22) Filed: Nov. 6, 2013

(30) Foreign Application Priority Data

Sep. 27, 2013 (TW) .............................. 102134961 A

(51) Int. Cl.
*G02B 13/18* (2006.01)
*G02B 13/00* (2006.01)
(52) U.S. Cl.
CPC .................................. *G02B 13/004* (2013.01)
USPC ....................................................... 359/715
(58) Field of Classification Search
USPC ....................................................... 359/715
See application file for complete search history.

(56) References Cited

U.S. PATENT DOCUMENTS

2009/0185288 A1* 7/2009 Taniyama ..................... 359/715
2014/0184872 A1 7/2014 Ho et al.

* cited by examiner

*Primary Examiner* — James Jones
(74) *Attorney, Agent, or Firm* — Tim Tingkang Xia, Esq.; Morris Manning & Martin, LLP

(57) ABSTRACT

An image capturing lens system includes, in order from an object side to an image side, a first lens element, a second lens element, a third lens element and a fourth lens element. The first lens element with positive refractive power has a convex image-side surface in a paraxial region thereof. The second lens element has negative refractive power. The third lens element with positive refractive power has a concave object-side surface in a paraxial region thereof and a convex image-side surface in a paraxial region thereof. The fourth lens element with refractive power has a concave image-side surface in a paraxial region thereof, wherein an object-side surface and the image-side surface of the fourth lens element are aspheric, and the image-side surface thereof has at least one convex shape in an off-axis region thereof. The image capturing lens system has a total of four lens elements with refractive power.

23 Claims, 21 Drawing Sheets

IMAGE CAPTURING LENS SYSTEM, IMAGING DEVICE AND MOBILE TERMINAL

RELATED APPLICATIONS

This application claims priority to Taiwan Application Serial Number 102134961, filed Sep. 27, 2013, which is incorporated by reference herein in its entirety.

BACKGROUND

1. Technical Field

The present disclosure relates to an image capturing lens system. More particularly, the present disclosure relates to a compact image capturing lens system applicable to portable electronic products.

2. Description of Related Art

Inner elements of modern electronic products are required to be scale-down for complying with the trend of modern electronic products of being compact. Expect for being compact, as the semiconductor manufacturing technologies have improved, the pixel size of sensors is reduced and optical systems have gradually evolved toward the field of higher megapixels. Consequently, there is an increasing demand for compact optical systems featuring better image quality.

A conventional compact optical system employed in a portable electronic product mainly adopts a three-element lens structure. Due to the popularity of mobile products with high-end specifications, such as smart phones and tablet personal computers, the pixel and image-quality requirements of the compact optical systems have increased rapidly. The conventional three-piece lens structure cannot satisfy the requirements of the compact optical systems.

On the other hand, the conventional optical system utilizes four-element lens structure for enhancing the image quality and resolution of the optical system, but it is not favorable for keeping a good balance between obtaining a wide viewing angle and reducing the total track length. Moreover, it is also not favorable for the resolving power and illumination in the peripheral region of an image; thus, this conventional optical system with four lens elements cannot satisfy the requirements of the compact optical systems with superior image quality.

Accordingly, there is an increasing demand for compact optical systems featuring better resolving power and illumination in the peripheral region of the image.

SUMMARY

According to one aspect of the present disclosure, an image capturing lens system includes, in order from an object side to an image side, a first lens element, a second lens element, a third lens element and a fourth lens element. The first lens element with positive refractive power has a convex image-side surface in a paraxial region thereof. The second lens element has negative refractive power. The third lens element with positive refractive power has a concave object-side surface in a paraxial region thereof and a convex image-side surface in a paraxial region thereof. The fourth lens element with refractive power has a concave image-side surface in a paraxial region thereof, wherein an object-side surface and the image-side surface of the fourth lens element are aspheric, and the image-side surface of the fourth lens element has at least one convex shape in an off-axis region thereof. The image capturing lens system has a total of four lens elements with refractive power. When an Abbe number of the first lens element is V1, an Abbe number of the third lens element is V3, an Abbe number of the second lens element is V2, an Abbe number of the fourth lens element is V4, an axial distance between the object-side surface of the first lens element and the image-side surface of the fourth lens element is Td, an axial distance between the object-side surface of the first lens element and an image plane is TL, and a maximum image height of the image capturing lens system is ImgH, the following conditions are satisfied:

$1.75 < (V1+V3)/(V2+V4) < 3.5;$ $0.50 \text{ mm} < Td < 1.90 \text{ mm};$ and $TL/ImgH < 2.75.$ According to another aspect of the present disclosure, an imaging device includes an image capturing lens system according to the aforementioned aspect and an image sensor, wherein the image sensor is disposed on an image plane of the image capturing lens system.

According to still another aspect of the present disclosure, a mobile terminal includes an imaging device according to the aforementioned aspect.

According to yet another aspect of the present disclosure, an image capturing lens system includes, in order from an object side to an image side, a first lens element, a second lens element, a third lens element and a fourth lens element. The first lens element with positive refractive power has a convex image-side surface in a paraxial region thereof. The second lens element with negative refractive power has a concave object-side surface in a paraxial region thereof. The third lens element with positive refractive power has a concave object-side surface in a paraxial region thereof and a convex image-side surface in a paraxial region thereof. The fourth lens element with refractive power has a concave image-side surface in a paraxial region thereof, wherein an object-side surface and the image-side surface of the fourth lens element are aspheric, and the image-side surface of the fourth lens element has at least one convex shape in an off-axis region thereof. The image capturing lens system has a total of four lens elements with refractive power. When an Abbe number of the first lens element is V1, an Abbe number of the third lens element is V3, an Abbe number of the second lens element is V2, an Abbe number of the fourth lens element is V4, an axial distance between the object-side surface of the first lens element and the image-side surface of the fourth lens element is Td, a curvature radius of the object-side surface of the second lens element is R3, and a curvature radius of the image-side surface of the second lens element is R4, the following conditions are satisfied:

$1.75 < (V1+V3)/(V2+V4) < 3.5;$ $0.50 \text{ mm} < Td < 1.90 \text{ mm};$ and $(R3+R4)/(R3-R4) < 0.9.$

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
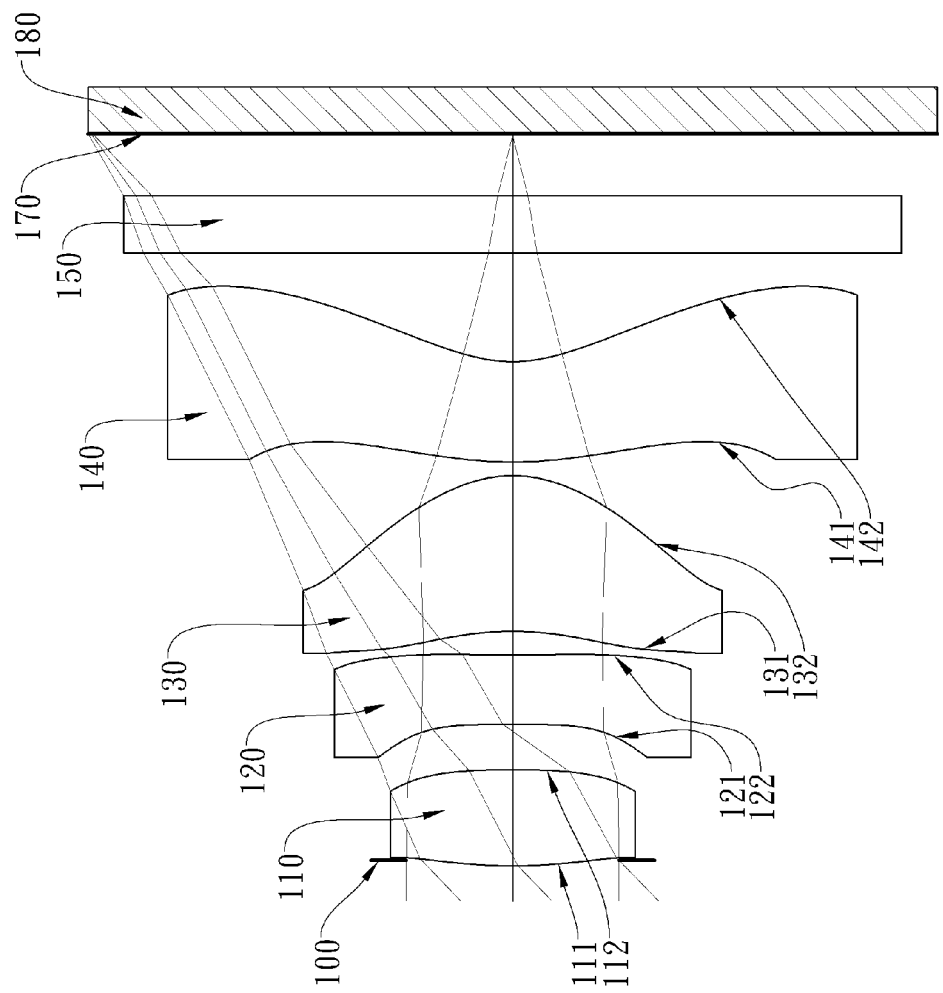
FIG. 1A is a schematic view of an imaging device according to the 1st embodiment of the present disclosure.

An image capturing lens system includes, in order from an object side to an image side, a first lens element, a second lens element, a third lens element and a fourth lens element. The image capturing lens system has a total of four lens elements with refractive power.

The first lens element has positive refractive power, so that it provides the image capturing lens system with the positive refractive power as it needs to be so as to reduce the total track length of the image capturing lens system. The first lens element can have a convex image-side surface in a paraxial region thereof; therefore, it is favorable for reducing the astigmatism of the image capturing lens system.

The second lens element has negative refractive power, so that it is favorable for correcting the aberration generated by the first lens element with positive refractive power. The second lens element can have a concave object-side surface in a paraxial region thereof and a concave image-side surface in a paraxial region thereof, so that it is favorable for effectively correcting the aberration of the image capturing lens system. The image-side surface of the second lens element can have at least one convex shape in an off-axis region thereof, so that it is favorable for reducing the incident angle of the light projecting onto an image sensor so as to increase the responding efficiency of the image sensor.

The third lens element has positive refractive power, so that it is favorable for effectively reducing the sensitivity of the image capturing lens system. The third lens element has a concave object-side surface in a paraxial region thereof and a convex image-side surface in a paraxial region thereof, so that it is favorable for correcting astigmatism of the image capturing lens system.

The fourth lens element can have negative refractive power, so that it is favorable for effectively correcting the Petzval sum of the image capturing lens system so as to correct image curvature. The fourth lens element can have a convex object-side surface in a paraxial region thereof and a concave image-side surface in a paraxial region thereof, wherein the image-side surface of the fourth lens element has at least one convex shape in an off-axis region thereof. Therefore, it is favorable for correcting astigmatism so as to effectively correct aberration of the off-axis.

When an Abbe number of the first lens element is V1, an Abbe number of the third lens element is V3, an Abbe number of the second lens element is V2, and an Abbe number of the fourth lens element is V4, the following condition is satisfied: $1.75<(V1+V3)/(V2+V4)<3.5$. Therefore, it is favorable for effectively correcting chromatic aberration of the image capturing lens system. Preferably, the following condition is satisfied: $2.0<(V1+V3)/(V2+V4)<3.0$.

When an axial distance between the object-side surface of the first lens element and the image-side surface of the fourth lens element is Td, and the following condition is satisfied: $0.50\ mm<Td<1.90\ mm$. Therefore, it is favorable for keeping a compact size of the image capturing lens system. Preferably, the following condition is satisfied: $0.80\ mm<Td<1.65\ mm$.

When a maximum image height of the image capturing lens system (half of a diagonal length of an effective photosensitive area of an image sensor) is ImgH, and an axial distance between the object-side surface of the first lens element and an image plane is TL, the following condition is satisfied: $TL/ImgH<2.75$. Therefore, it is favorable for further keeping a compact size of the image capturing lens system so as to be applied to the compact and portable electronic products. Preferably, the following condition is satisfied: $TL/ImgH<2.4$.

When a curvature radius of the object-side surface of the second lens element is R3, and a curvature radius of the image-side surface of the second lens element is R4, the following condition is satisfied: $(R3+R4)/(R3-R4)<0.9$. Therefore, it is favorable for further correcting the aberration.

When a curvature radius of the object-side surface of the third lens element is R5, and a curvature radius of the image-side surface of the third lens element is R6, the following condition is satisfied: $1.0<R5/R6<2.65$. Therefore, it is favorable for correcting astigmatism.

When a focal length of the image capturing lens system is f, and a curvature radius of the image-side surface of the second lens element is R4, the following condition is satisfied: $f/R4<1.0$. Therefore, it is favorable for reducing the aberration.

When a maximal field of view of the image capturing lens system is FOV, and the following condition is satisfied: $1/|\tan(FOV)|<0.28$. Therefore, it is favorable for obtaining a sufficient field of view.

When a refractive index of the fourth lens element is N4, and the following condition is satisfied: 1.60<N4<1.75. Therefore, it is favorable for reducing the chromatic aberration.

When an axial distance between the first lens element and the second lens element is T12, an axial distance between the second lens element and the third lens element is T23, an axial distance between the third lens element and the fourth lens element is T34, and the axial distance between the object-side surface of the first lens element and the image-side surface of the fourth lens element is Td, the following condition is satisfied: 0.02<(T12+T23+T34)/Td<0.20. Therefore, it is favorable for assembling the lens elements so as to increase the manufacturing yield rate.

When a curvature radius of the image-side surface of the first lens element is R2, and the focal length of the image capturing lens system is f, the following condition is satisfied: −1.75<R2/f<0. Therefore, it is favorable for reducing spherical aberration.

When a minimum central thickness of a lens element among the first lens element, the second lens element, the third lens element and the fourth lens element of the image capturing lens system is CTmin, and the following condition is satisfied: 0.1 mm<CTmin<0.25 mm. Therefore, it provides favorable moldability and homogeneity for plastic lens elements during the injection molding process.

According to the image capturing lens system of the present disclosure, the lens elements can be made of plastic or glass material. When the lens elements are made of glass material, the distribution of the refractive power of the image capturing lens system can be more flexible to design. When the lens elements are made of plastic material, the manufacturing cost thereof can be reduced. Furthermore, surfaces of each lens element can be arranged to be aspheric, because the aspheric surface of the lens element is easy to form a shape other than spherical surface so as to have more controllable variables for eliminating the aberration thereof, and to further decrease the required number of the lens elements. Thus, the total track length of the image capturing lens system can be effectively reduced.

According to the image capturing lens system of the present disclosure, the image capturing lens system can include at least one stop, such as an aperture stop, a glare stop or a field stop. Said glare stop or said field stop is for eliminating the stray light and thereby improving the image resolution thereof.

According to the image capturing lens system of the present disclosure, the aperture stop can be configured as a front stop or a middle stop. A front stop disposed between an imaged object and the first lens element can provide a longer distance between an exit pupil of the system and the image plane, which improves the image-sensing efficiency of the image sensor. A middle stop disposed between the first lens element and the image plane is favorable for enlarging the field of view of the system and thereby provides a wider field of view for the same.

According to the image capturing lens system of the present disclosure, when the lens element has a convex surface, it indicates that the surface is convex in the paraxial region thereof; when the lens element has a concave surface, it indicates that the surface is concave in the paraxial region thereof. Particularly, the paraxial region thereof refers to the region of the surface where light rays travel close to an optical axis and an off-axis region thereof refers to the region of the surface where light rays travel away from the optical axis.

According to the image capturing lens system of the present disclosure, the image capturing lens system is featured with good correction ability and high image quality, and can be applied to 3D (three-dimensional) image capturing applications, in products such as digital cameras, mobile devices, digital tablets, wearable devices and other portable devices.

According to the present disclosure, an imaging device is provided. The imaging device includes the image capturing lens system according to the aforementioned image capturing lens system of the present disclosure, and an image sensor, wherein the image sensor is disposed on an image plane of the aforementioned image capturing lens system. Therefore, it is favorable for reducing the total track length while obtaining a larger field of view and improving the resolving power and illumination in the peripheral region of an image. Preferably, the imaging device can further include a barrel member and/or a holding member.

Figure 10A:
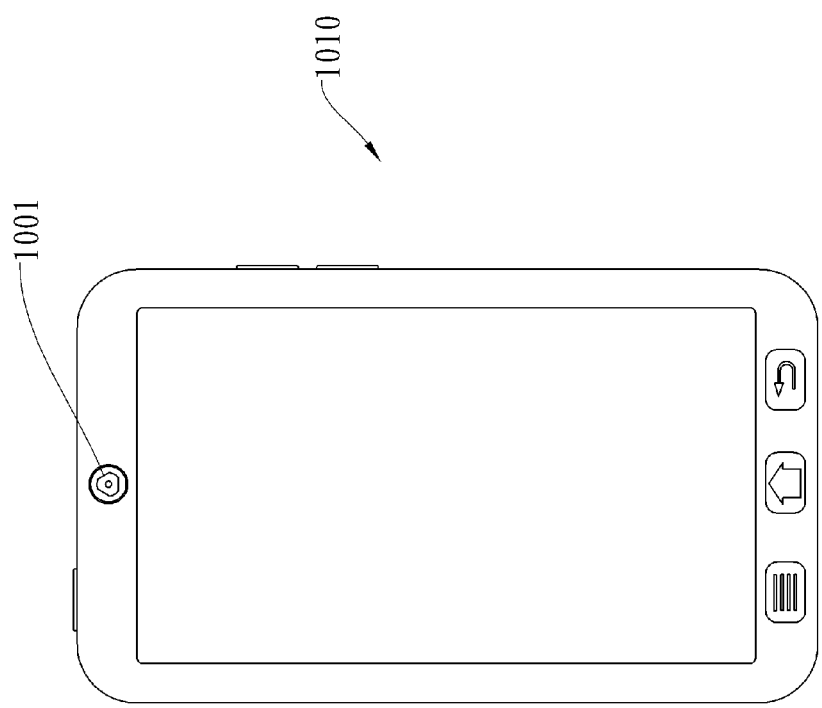
FIG. 10A shows a smart phone with an imaging device of the present disclosure installed therein.
Figure 10B:
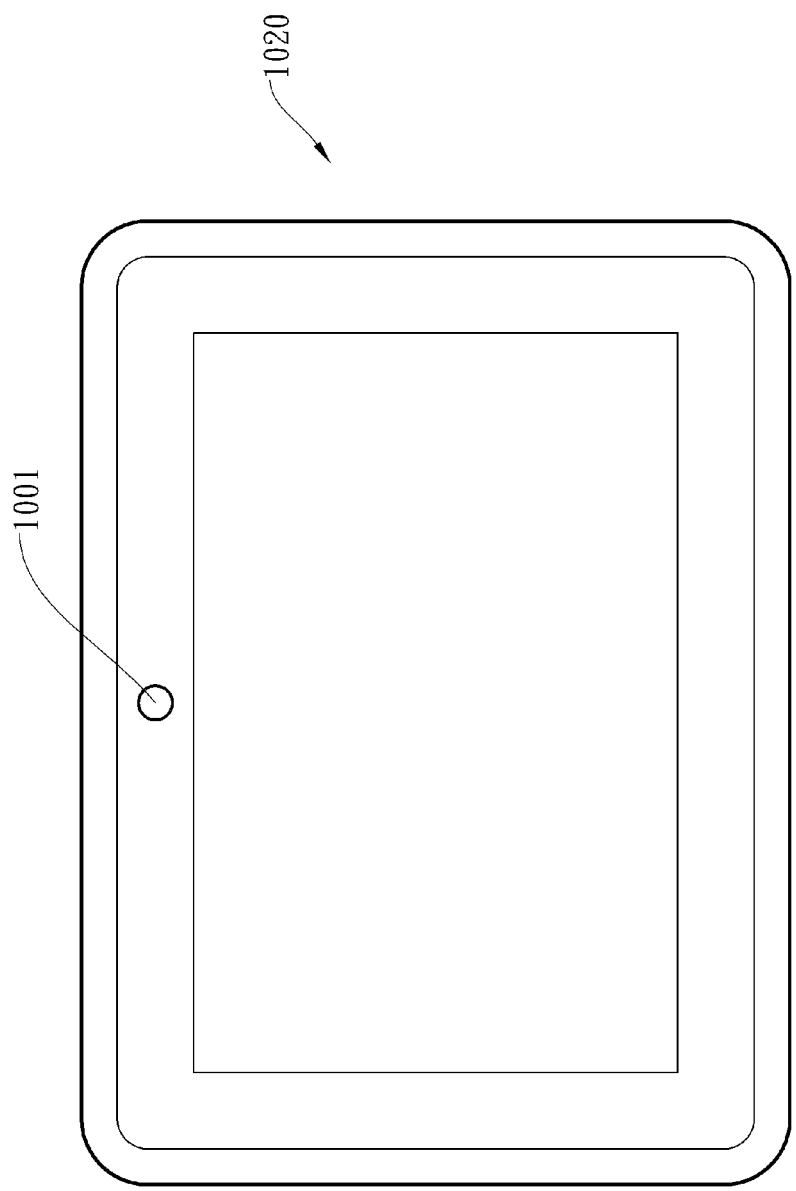
FIG. 10B shows a tablet personal computer with an imaging device of the present disclosure installed therein.
Figure 10C:
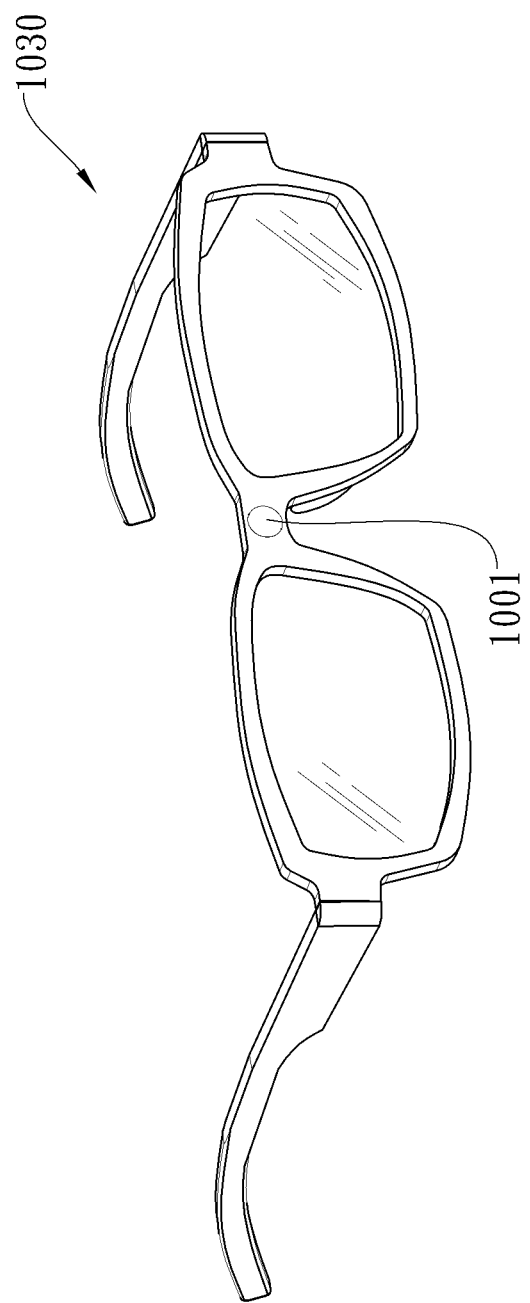
FIG. 10C shows a wearable device with an imaging device of the present disclosure installed therein.

In FIG. 10A, FIG. 10B and FIG. 10C, an imaging device 1001 may be installed in but not limited to a mobile terminal, including a smart phone 1010, a tablet personal computer 1020 or a wearable device 1030. The three exemplary figures of different kinds of mobile terminal are only exemplary for showing the imaging device of present disclosure installing in a mobile terminal and is not limited thereto. Preferably, the mobile terminal can further include but not limited to display, control unit, random access memory unit (RAM) and/or read only memory unit (ROM).

According to the above description of the present disclosure, the following 1st-9th specific embodiments are provided for further explanation.

1st Embodiment

Figure 1B:
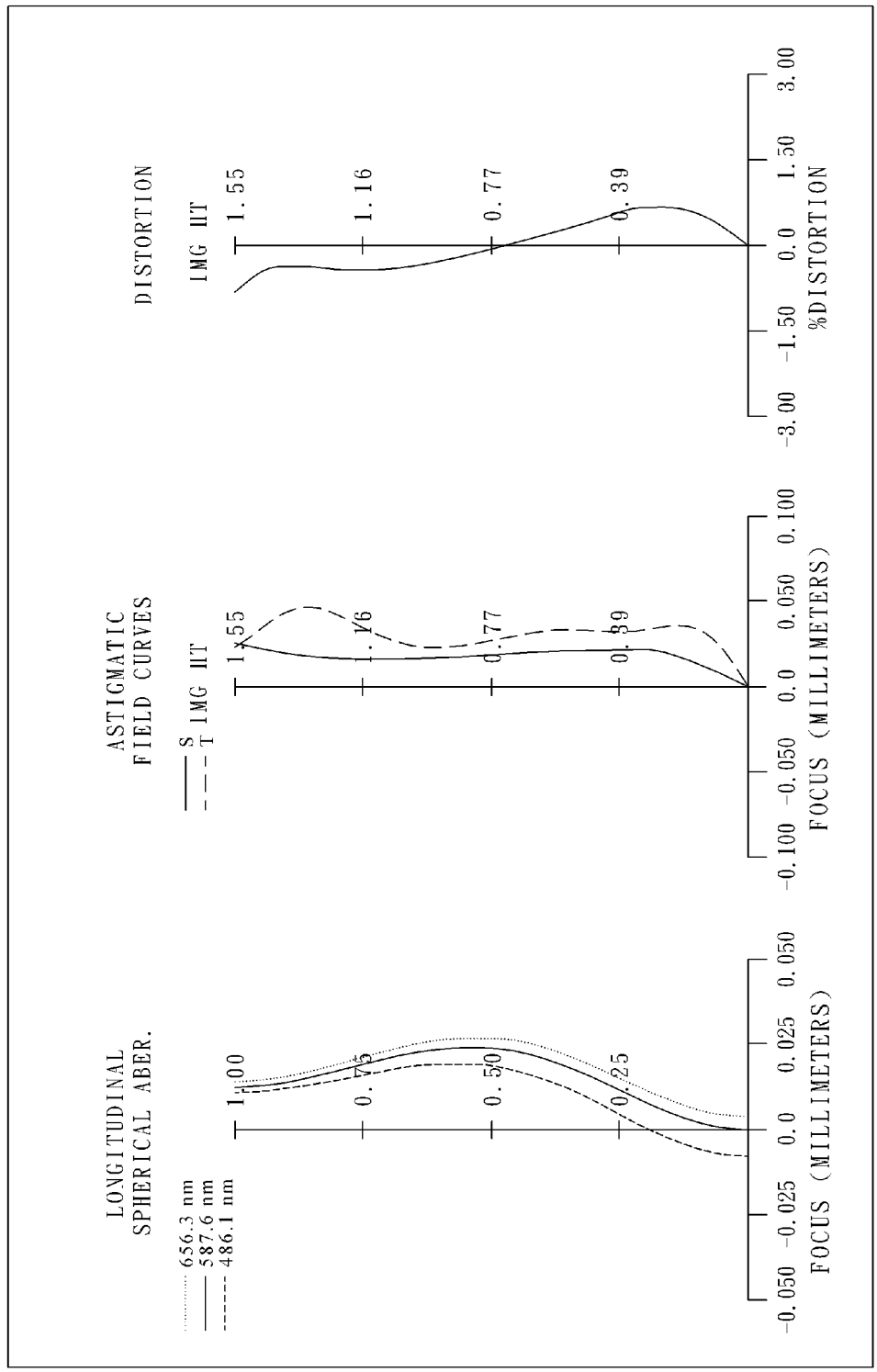
FIG. 1B shows spherical aberration curves, astigmatic field curves and a distortion curve of the imaging device according to the 1st embodiment.

FIG. 1A is a schematic view of an imaging device according to the 1st embodiment of the present disclosure. The imaging device includes an image capturing lens system (not otherwise herein labeled) of the present disclosure and an image sensor 180. FIG. 1B shows spherical aberration curves, astigmatic field curves and a distortion curve of the image capturing lens system according to the 1st embodiment. In FIG. 1A, the image capturing lens system includes, in order from an object side to an image side, an aperture stop 100, a first lens element 110, a second lens element 120, a third lens element 130, a fourth lens element 140, an IR-cut filter 150 and an image plane 170, wherein the image capturing lens system has a total of four lens elements (110-140) with refractive power.

The first lens element 110 with positive refractive power has a convex object-side surface 111 in a paraxial region thereof and a convex image-side surface 112 in a paraxial region thereof, and is made of plastic material. The object-side surface 111 and the image-side surface 112 of the first lens element 110 are aspheric.

The second lens element 120 with negative refractive power has a concave object-side surface 121 in a paraxial region thereof and a concave image-side surface 122 in a paraxial region thereof, and is made of plastic material. The object-side surface 121 and the image-side surface 122 of the second lens element 120 are aspheric. Furthermore, the image-side surface 122 of the second lens element 120 has at least one convex shape in an off-axis region thereof.

The third lens element 130 with positive refractive power has a concave object-side surface 131 in a paraxial region thereof and a convex image-side surface 132 in a paraxial region thereof, and is made of plastic material. The object-side surface 131 and the image-side surface 132 of the third lens element 130 are aspheric.

The fourth lens element 140 with negative refractive power has a convex object-side surface 141 in a paraxial region thereof and a concave image-side surface 142 in a paraxial region thereof, and is made of plastic material. The object-side surface 141 and the image-side surface 142 of the fourth lens element 140 are aspheric. Furthermore, the image-side surface 142 of the fourth lens element 140 has at least one convex shape in an off-axis region thereof.

The second lens element 120 has the minimum central thickness amongst all lens elements of the image capturing lens system. The IR-cut filter 150 is made of glass and located between the fourth lens element 140 and the image plane 170, and will not affect the focal length of the image capturing lens system. The image sensor 180 is disposed on the image plane 170 of the image capturing lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius of the lens elements;

k is the conic coefficient; and

Ai is the i-th aspheric coefficient.

In the image capturing lens system of the imaging device according to the 1st embodiment, when a focal length of the image capturing lens system is f, an f-number of the image capturing lens system is Fno, and half of a maximal field of view of the image capturing lens system is HFOV, these parameters have the following values: f=1.60 mm; Fno=2.05; and HFOV=44.0 degrees.

In the image capturing lens system of the imaging device according to the 1st embodiment, when an Abbe number of the first lens element 110 is V1, an Abbe number of the third lens element 130 is V3, an Abbe number of the second lens element 120 is V2, and an Abbe number of the fourth lens element 140 is V4, the following condition is satisfied: (V1+V3)/(V2+V4)=2.35.

In the image capturing lens system of the imaging device according to the 1st embodiment, when an axial distance between the object-side surface 111 of the first lens element 110 and the image-side surface 142 of the fourth lens element 140 is Td, the following condition is satisfied: Td=1.86 mm.

In the image capturing lens system of the imaging device according to the 1st embodiment, when a maximum image height of the image capturing lens system is ImgH, and an axial distance between the object-side surface 111 of the first lens element 110 and an image plane 170 is TL, the following condition is satisfied: TL/ImgH=1.74.

In the image capturing lens system of the imaging device according to the 1st embodiment, when a curvature radius of the image-side surface 112 of the first lens element 110 is R2, and the focal length of the image capturing lens system is f, the following condition is satisfied: R2/f=−2.38.

In the image capturing lens system of the imaging device according to the 1st embodiment, when a curvature radius of the object-side surface 121 of the second lens element 120 is R3, and a curvature radius of the image-side surface 122 of the second lens element 120 is R4, the following condition is satisfied: (R3+R4)/(R3−R4)=0.35.

In the image capturing lens system of the imaging device according to the 1st embodiment, when the maximal field of view of the image capturing lens system is FOV, the following condition is satisfied: 1/|tan(FOV)|=0.03.

In the image capturing lens system of the imaging device according to the 1st embodiment, when the focal length of the image capturing lens system is f, and a curvature radius of the image-side surface 122 of the second lens element 120 is R4, the following condition is satisfied: f/R4=0.23.

In the image capturing lens system of the imaging device according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, and the axial distance between the object-side surface 111 of the first lens element 110 and the image-side surface 142 of the fourth lens element 140 is Td, the following condition is satisfied: (T12+T23+T34)/Td=0.16.

In the image capturing lens system of the imaging device according to the 1st embodiment, when a minimum central thickness of a lens element among the first lens element 110, the second lens element 120, the third lens element 130 and the fourth lens element 140 of the image capturing lens system is CTmin, the following condition is satisfied: CTmin=0.26 mm.

In the image capturing lens system of the imaging device according to the 1st embodiment, when a curvature radius of the object-side surface 131 of the third lens element 130 is R5, and a curvature radius of the image-side surface 132 of the third lens element 130 is R6, the following condition is satisfied: R5/R6=2.49.

In the image capturing lens system of the imaging device according to the 1st embodiment, when a refractive index of the fourth lens element 140 is N4, the following condition is satisfied: N4=1.63.

The detailed optical data of the 1st embodiment are shown in Table 1 and the aspheric surface data are shown in Table 2 below.

TABLE 1

1st Embodiment
f = 1.60 mm, Fno = 2.05, HFOV = 44.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.020 | | | | |
| 2 | Lens 1 | 1.836 | ASP | 0.354 | Plastic | 1.544 | 55.9 | 2.33 |
| 3 | | −3.809 | ASP | 0.167 | | | | |
| 4 | Lens 2 | −14.578 | ASP | 0.255 | Plastic | 1.634 | 23.8 | −7.40 |

TABLE 1-continued

1st Embodiment
f = 1.60 mm, Fno = 2.05, HFOV = 44.0 deg.

| Surface # | | Curvature Radius | | Thickness | Material | Index | Abbe # | Focal Length |
|---|---|---|---|---|---|---|---|---|
| 5 | | 6.967 | ASP | 0.087 | | | | |
| 6 | Lens 3 | −1.176 | ASP | 0.573 | Plastic | 1.544 | 55.9 | 1.13 |
| 7 | | −0.473 | ASP | 0.050 | | | | |
| 8 | Lens 4 | 1.344 | ASP | 0.369 | Plastic | 1.634 | 23.8 | −1.51 |
| 9 | | 0.500 | ASP | 0.400 | | | | |
| 10 | IR-cut filter | Plano | | 0.210 | Glass | 1.517 | 64.2 | — |
| 11 | | Plano | | 0.229 | | | | |
| 12 | Image | Plano | | — | | | | |

Note:
Reference wavelength is 587.6 nm (d-line).
The effective radius of Surface 3 is 0.450 mm.

TABLE 2

Aspheric Coefficients

| Surface # | 2 | 3 | 4 | 5 |
|---|---|---|---|---|
| k = | −8.3274E+00 | −1.0000E+00 | 1.0000E+01 | −9.0000E+01 |
| A4 = | −9.4059E−02 | −1.1439E+00 | −1.9074E+00 | −7.1220E−01 |
| A6 = | −1.8379E+00 | −8.3102E−01 | 8.3705E−01 | 1.3308E+00 |
| A8 = | 5.2451E+00 | 1.7630E−01 | −3.8869E+01 | −9.1289E−01 |
| A10 = | −3.1032E+01 | 1.1498E+00 | 2.2450E+02 | −1.5698E+00 |
| A12 = | | | −3.2168E+02 | |
| Surface # | 6 | 7 | 8 | 9 |
| k = | −5.3421E+00 | −1.9395E+00 | −3.9488E+01 | −5.3443E+00 |
| A4 = | −2.6272E−01 | −3.7834E−01 | 3.0136E−01 | −8.2354E−02 |
| A6 = | 4.8404E+00 | 1.3641E+00 | −1.2162E+00 | −1.1300E−01 |
| A8 = | −7.6619E+00 | −5.2469E+00 | 1.4877E+00 | 1.8295E−01 |
| A10 = | −2.1763E+01 | 1.2705E+01 | −8.6813E−01 | −1.3073E−01 |
| A12 = | 8.8738E+01 | −1.1792E+01 | 6.5819E−02 | 4.9965E−02 |
| A14 = | −1.1142E+02 | 3.6291E+00 | 1.1454E−01 | −1.1058E−02 |
| A16 = | 4.6554E+01 | | −2.8314E−02 | 1.1206E−03 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 2A:
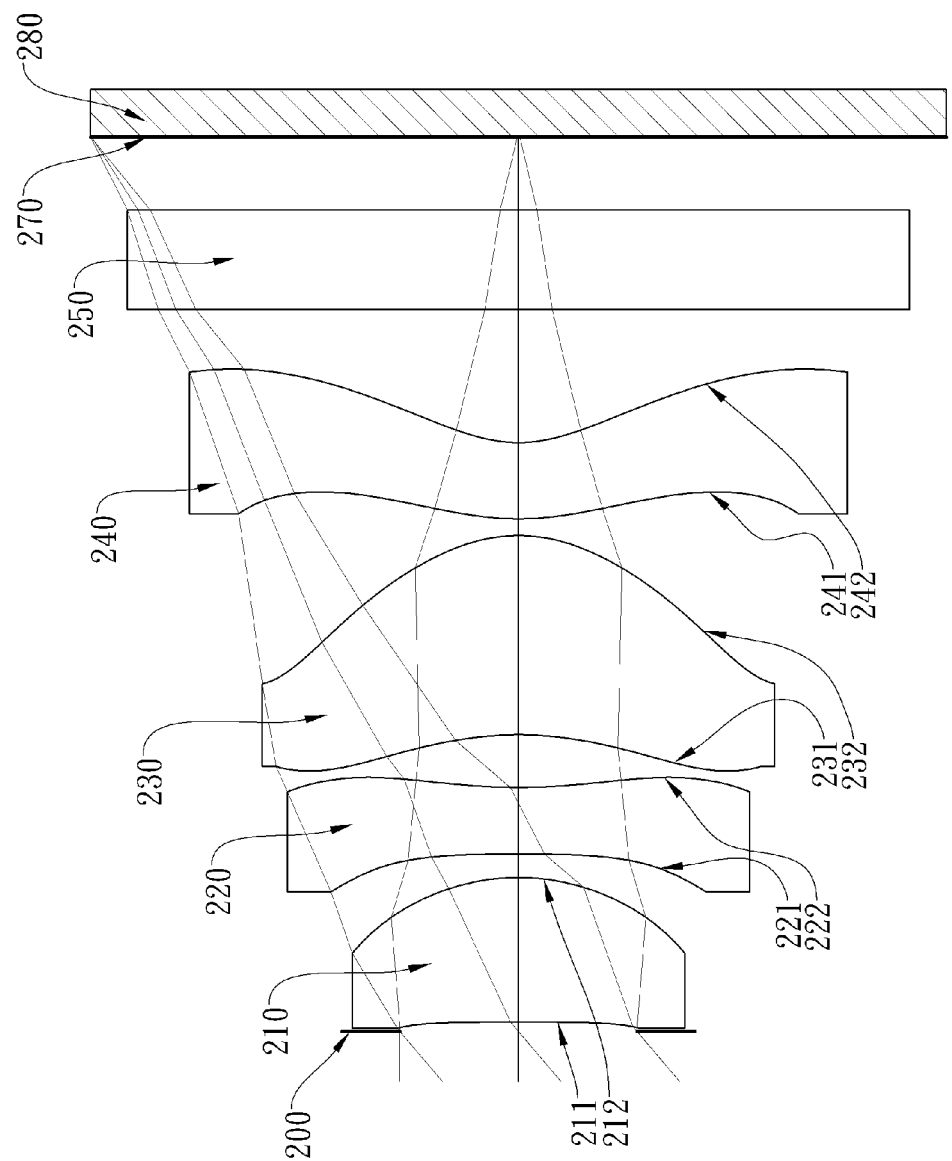
FIG. 2A is a schematic view of an imaging device according to the 2nd embodiment of the present disclosure.
Figure 2B:
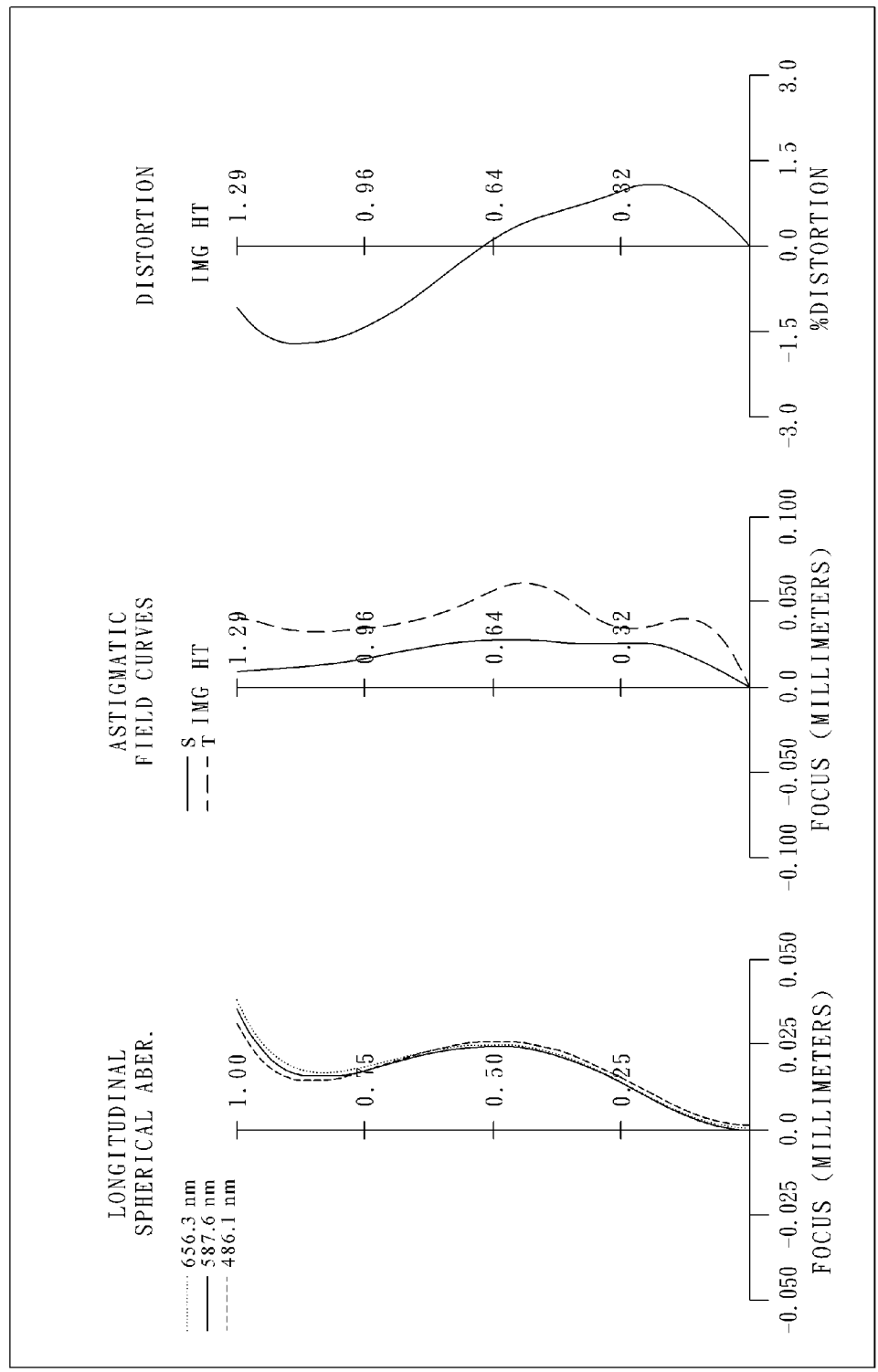
FIG. 2B shows spherical aberration curves, astigmatic field curves and a distortion curve of the imaging device according to the 2nd embodiment.

FIG. 2A is a schematic view of an imaging device according to the 2nd embodiment of the present disclosure. The imaging device includes an image capturing lens system (not otherwise herein labeled) of the present disclosure and an image sensor 280. FIG. 2B shows spherical aberration curves, astigmatic field curves and a distortion curve of the image capturing lens system according to the 2nd embodiment. In FIG. 2A, the image capturing lens system includes, in order from an object side to an image side, an aperture stop 200, a first lens element 210, a second lens element 220, a third lens element 230, a fourth lens element 240, an IR-cut filter 250 and an image plane 270, wherein the image capturing lens system has a total of four lens elements (210-240) with refractive power.

The first lens element 210 with positive refractive power has a concave object-side surface 211 in a paraxial region thereof and a convex image-side surface 212 in a paraxial region thereof, and is made of plastic material. The object-side surface 211 and the image-side surface 212 of the first lens element 210 are aspheric.

The second lens element 220 with negative refractive power has a concave object-side surface 221 in a paraxial region thereof and a concave image-side surface 222 in a paraxial region thereof, and is made of plastic material. The object-side surface 221 and the image-side surface 222 of the second lens element 220 are aspheric. Furthermore, the image-side surface 222 of the second lens element 220 has at least one convex shape in an off-axis region thereof.

The third lens element 230 with positive refractive power has a concave object-side surface 231 in a paraxial region thereof and a convex image-side surface 232 in a paraxial region thereof, and is made of plastic material. The object-side surface 231 and the image-side surface 232 of the third lens element 230 are aspheric.

The fourth lens element 240 with negative refractive power has a convex object-side surface 241 in a paraxial region thereof and a concave image-side surface 242 in a paraxial region thereof, and is made of plastic material. The object-side surface 241 and the image-side surface 242 of the fourth lens element 240 are aspheric. Furthermore, the image-side surface 242 of the fourth lens element 240 has at least one convex shape in an off-axis region thereof.

The second lens element 220 has the minimum central thickness amongst all lens elements of the image capturing lens system. The IR-cut filter 250 is made of glass and located between the fourth lens element 240 and the image plane 270, and will not affect the focal length of the image capturing lens system. The image sensor 280 is disposed on the image plane 270 of the image capturing lens system.

The detailed optical data of the 2nd embodiment are shown in Table 3 and the aspheric surface data are shown in Table 4 below.

TABLE 3

2nd Embodiment
f = 1.51 mm, Fno = 2.12, HFOV = 40.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.028 | | | | |
| 2 | Lens 1 | −86.606 | ASP | 0.436 | Plastic | 1.544 | 55.9 | 1.17 |
| 3 | | −0.633 | ASP | 0.071 | | | | |
| 4 | Lens 2 | −4.836 | ASP | 0.200 | Plastic | 1.634 | 23.8 | −1.94 |
| 5 | | 1.681 | ASP | 0.159 | | | | |
| 6 | Lens 3 | −1.020 | ASP | 0.600 | Plastic | 1.530 | 55.8 | 1.16 |
| 7 | | −0.463 | ASP | 0.050 | | | | |
| 8 | Lens 4 | 0.777 | ASP | 0.230 | Plastic | 1.614 | 25.6 | −1.68 |
| 9 | | 0.393 | ASP | 0.400 | | | | |
| 10 | IR-cut filter | Plano | | 0.300 | Glass | 1.517 | 64.2 | — |
| 11 | | Plano | | 0.221 | | | | |
| 12 | Image | Plano | | — | | | | |

Note:
Reference wavelength is 587.6 nm (d-line).

TABLE 4

Aspheric Coefficients

| Surface # | 2 | 3 | 4 | 5 |
|---|---|---|---|---|
| k = | −5.0000E+01 | −6.9298E+00 | −5.0000E+01 | 1.1548E+00 |
| A4 = | −4.3604E−01 | −2.1551E+00 | −1.6947E−01 | −7.1585E−01 |
| A6 = | −5.9937E+00 | 4.7070E+00 | −7.6697E+00 | −7.3869E−01 |
| A8 = | 3.4911E+01 | −1.2381E+01 | 3.3930E+01 | 2.2634E+00 |
| A10 = | −1.5257E+02 | 6.2575E+00 | −7.9500E+01 | −1.7362E+00 |
| A12 = | | | 8.7499E+01 | |

| Surface # | 6 | 7 | 8 | 9 |
|---|---|---|---|---|
| k = | −4.0113E+00 | −1.5741E+00 | −1.6288E+01 | −4.5667E+00 |
| A4 = | 2.1754E−01 | 1.9784E−01 | 2.1845E−01 | −2.6492E−01 |
| A6 = | −1.0500E+00 | −6.8326E−01 | −2.8538E+00 | −6.7027E−01 |
| A8 = | 6.5452E+00 | −3.9918E+00 | 6.7936E+00 | 2.5267E+00 |
| A10 = | −1.1172E+01 | 1.7017E+01 | −7.6381E+00 | −3.6515E+00 |
| A12 = | 7.8088E+00 | −1.8247E+01 | 3.2857E+00 | 2.6224E+00 |
| A14 = | −1.8631E+00 | 6.0668E+00 | 3.0350E−03 | −8.9191E−01 |
| A16 = | −1.6943E−01 | | −2.0974E−01 | 1.0990E−01 |

In the image capturing lens system according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following conditions:

| 2nd Embodiment | | | |
|---|---|---|---|
| f [mm] | 1.51 | (R3 + R4)/(R3 − R4) | 0.48 |
| Fno | 2.12 | 1/|tan(FOV)| | 0.16 |
| HFOV [deg.] | 40.4 | f/R4 | 0.90 |
| (V1 + V3)/(V2 + V4) | 2.26 | (T12 + T23 + T34)/Td | 0.16 |
| Td [mm] | 1.75 | CTmin [mm] | 0.20 |
| TL/ImgH | 2.08 | R5/R6 | 2.20 |
| R2/f | −0.42 | N4 | 1.61 |

3rd Embodiment

Figure 3A:
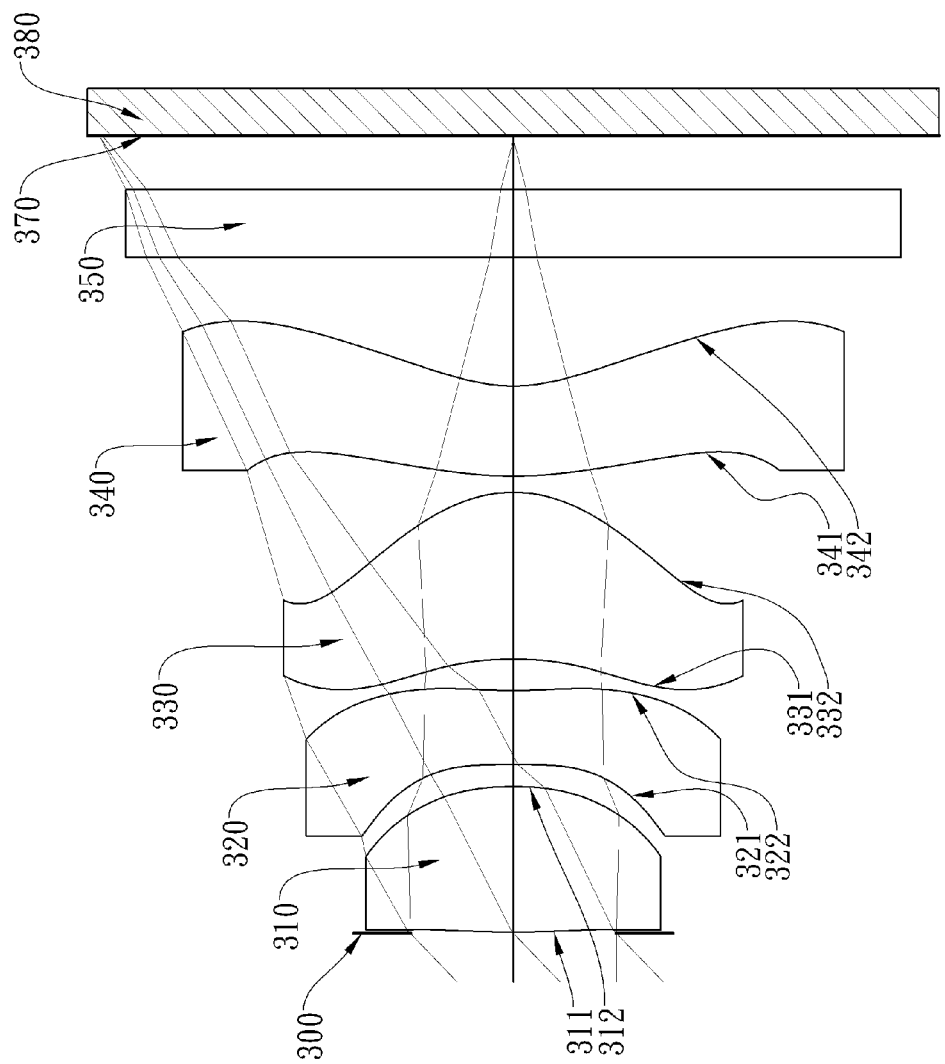
FIG. 3A is a schematic view of an imaging device according to the 3rd embodiment of the present disclosure.
Figure 3B:
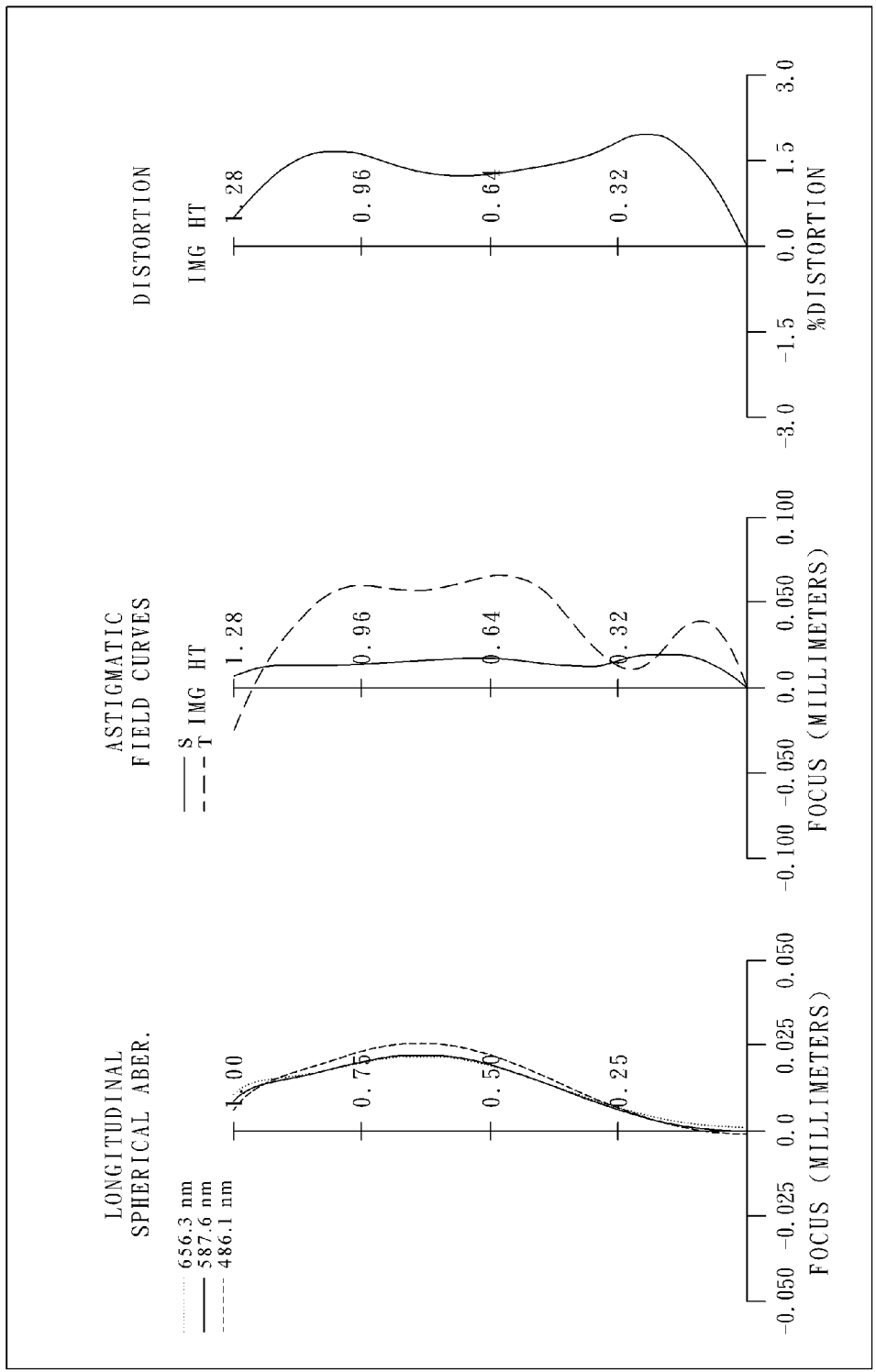
FIG. 3B shows spherical aberration curves, astigmatic field curves and a distortion curve of the imaging device according to the 3rd embodiment.

FIG. 3A is a schematic view of an imaging device according to the 3rd embodiment of the present disclosure. The imaging device includes an image capturing lens system (not otherwise herein labeled) of the present disclosure and an image sensor 380. FIG. 3B shows spherical aberration curves, astigmatic field curves and a distortion curve of the image capturing lens system according to the 3rd embodiment. In FIG. 3A, the image capturing lens system includes, in order from an object side to an image side, an aperture stop 300, a first lens element 310, a second lens element 320, a third lens element 330, a fourth lens element 340, an IR-cut filter 350 and an image plane 370, wherein the image capturing lens system has a total of four lens elements (310-340) with refractive power.

The first lens element 310 with positive refractive power has a convex object-side surface 311 in a paraxial region thereof and a convex image-side surface 312 in a paraxial region thereof, and is made of plastic material. The object-side surface 311 and the image-side surface 312 of the first lens element 310 are aspheric.

The second lens element 320 with negative refractive power has a concave object-side surface 321 in a paraxial region thereof and a concave image-side surface 322 in a paraxial region thereof, and is made of plastic material. The object-side surface 321 and the image-side surface 322 of the second lens element 320 are aspheric. Furthermore, the image-side surface 322 of the second lens element 320 has at least one convex shape in an off-axis region thereof.

The third lens element 330 with positive refractive power has a concave object-side surface 331 in a paraxial region thereof and a convex image-side surface 332 in a paraxial region thereof, and is made of plastic material. The object-side surface 331 and the image-side surface 332 of the third lens element 330 are aspheric.

The fourth lens element 340 with negative refractive power has a convex object-side surface 341 in a paraxial region thereof and a concave image-side surface 342 in a paraxial region thereof, and is made of plastic material. The object-side surface 341 and the image-side surface 342 of the fourth lens element 340 are aspheric. Furthermore, the image-side surface 342 of the fourth lens element 340 has at least one convex shape in an off-axis region thereof.

The second lens element 320 has the minimum central thickness amongst all lens elements of the image capturing lens system. The IR-cut filter 350 is made of glass and located between the fourth lens element 340 and the image plane 370, and will not affect the focal length of the image capturing lens system. The image sensor 380 is disposed on the image plane 370 of the image capturing lens system.

The detailed optical data of the 3rd embodiment are shown in Table 5 and the aspheric surface data are shown in Table 6 below.

TABLE 5

3rd Embodiment
f = 1.31 mm, Fno = 2.05, HFOV = 44.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.004 | | | | |
| 2 | Lens 1 | 3.268 | ASP | 0.452 | Plastic | 1.544 | 55.9 | 1.42 |
| 3 | | −0.963 | ASP | 0.068 | | | | |
| 4 | Lens 2 | −10.424 | ASP | 0.230 | Plastic | 1.634 | 23.8 | −2.04 |
| 5 | | 1.489 | ASP | 0.098 | | | | |
| 6 | Lens 3 | −1.047 | ASP | 0.518 | Plastic | 1.544 | 55.9 | 0.97 |
| 7 | | −0.411 | ASP | 0.050 | | | | |
| 8 | Lens 4 | 1.088 | ASP | 0.280 | Plastic | 1.634 | 23.8 | −1.79 |
| 9 | | 0.500 | ASP | 0.400 | | | | |
| 10 | IR-cut filter | Plano | | 0.210 | Glass | 1.517 | 64.2 | — |
| 11 | | Plano | | 0.167 | | | | |
| 12 | Image | Plano | | — | | | | |

Note:
Reference wavelength is 587.6 nm (d-line).

TABLE 6

Aspheric Coefficients

| Surface # | 2 | 3 | 4 | 5 |
|---|---|---|---|---|
| k = | −1.9348E+01 | −1.0000E+00 | 1.0000E+01 | −9.0000E+01 |
| A4 = | −2.8684E−01 | −4.8796E+00 | −8.2575E+00 | −2.9520E+00 |
| A6 = | −6.1649E+00 | 2.9166E+01 | 3.2329E+01 | 1.1669E+01 |
| A8 = | 4.7883E+01 | −1.1160E+02 | −4.5451E+01 | −2.7335E+01 |
| A10 = | −3.6032E+02 | 1.2787E+02 | −3.3899E+02 | 2.2715E+01 |
| A12 = | | | 1.1200E+03 | |

| Surface # | 6 | 7 | 8 | 9 |
|---|---|---|---|---|
| k = | −5.3653E+00 | −1.5455E+00 | −3.8756E+01 | −5.3344E+00 |
| A4 = | −2.6800E+00 | −7.4015E−01 | 3.6178E−01 | −5.8971E−01 |
| A6 = | 2.4720E+01 | 4.8293E+00 | −1.7712E+00 | 1.6589E+00 |
| A8 = | −8.8206E+01 | −1.7426E+01 | 3.8348E+00 | −2.9957E+00 |
| A10 = | 1.7955E+02 | 4.8988E+01 | −5.9033E+00 | 2.9644E+00 |
| A12 = | −2.1135E+02 | −5.8496E+01 | 4.1280E+00 | −1.6841E+00 |
| A14 = | 1.3319E+02 | 2.3100E+01 | −1.0713E+00 | 5.0376E−01 |
| A16 = | −3.4655E+01 | | 5.0224E−02 | −5.8251E−02 |

In the image capturing lens system according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following conditions:

| 3rd Embodiment | | | |
|---|---|---|---|
| f [mm] | 1.31 | (R3 + R4)/(R3 − R4) | 0.75 |
| Fno | 2.05 | 1/|tan(FOV)| | 0.03 |
| HFOV [deg.] | 44.0 | f/R4 | 0.88 |
| (V1 + V3)/(V2 + V4) | 2.35 | (T12 + T23 + T34)/Td | 0.13 |
| Td [mm] | 1.70 | CTmin [mm] | 0.23 |
| TL/ImgH | 1.93 | R5/R6 | 2.55 |
| R2/f | −0.73 | N4 | 1.63 |

4th Embodiment

Figure 4A:
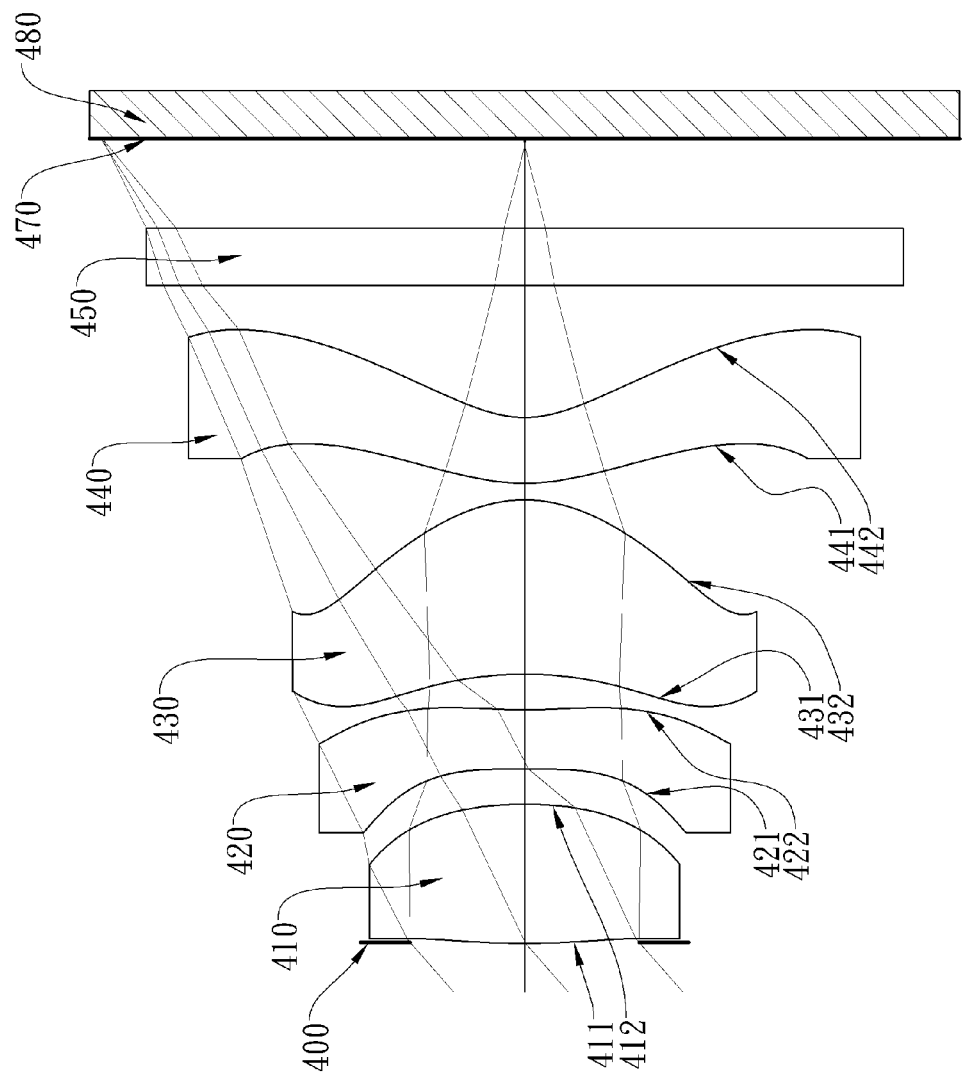
FIG. 4A is a schematic view of an imaging device according to the 4th embodiment of the present disclosure.
Figure 4B:
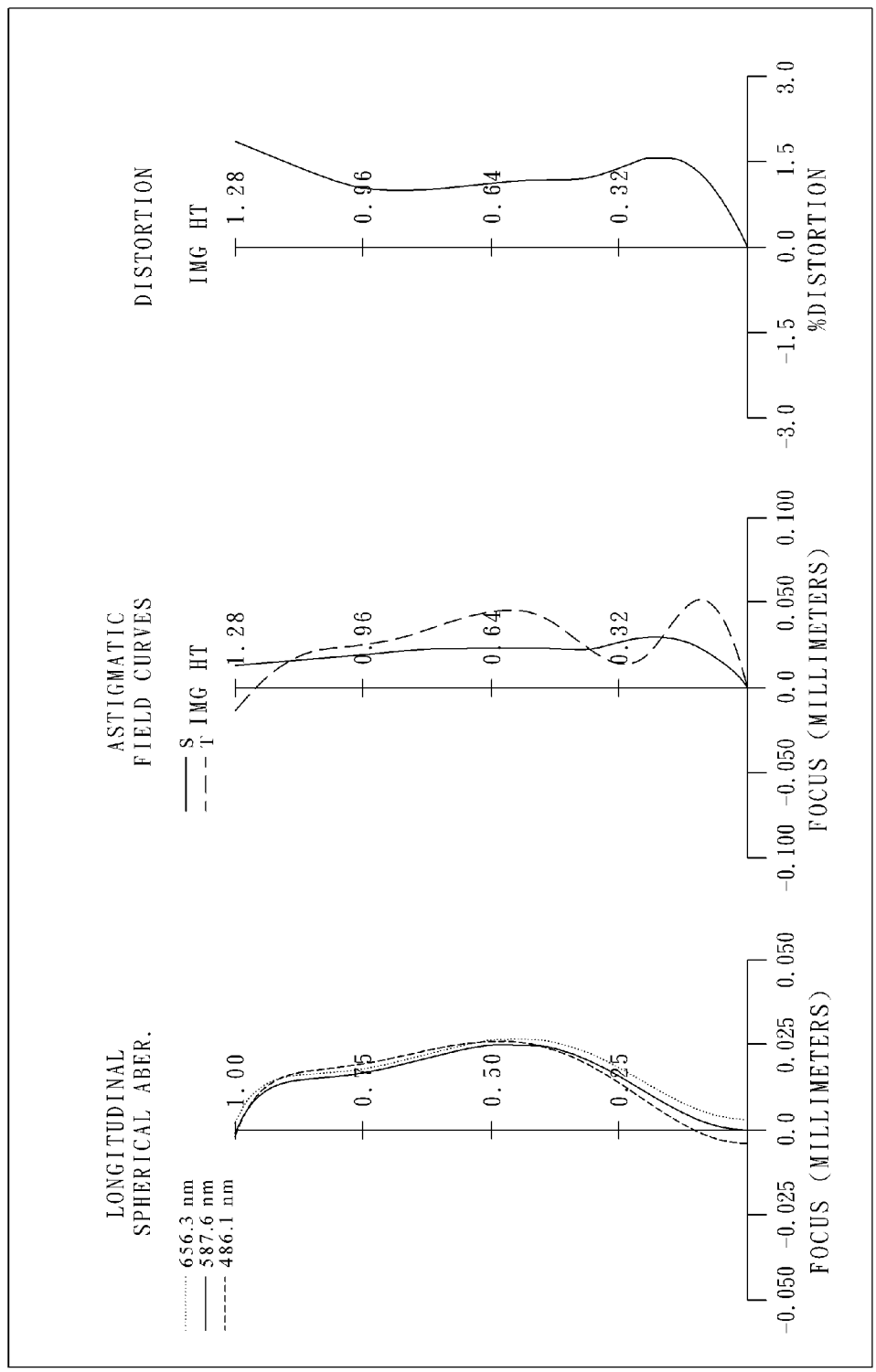
FIG. 4B shows spherical aberration curves, astigmatic field curves and a distortion curve of the imaging device according to the 4th embodiment.

FIG. 4A is a schematic view of an imaging device according to the 4th embodiment of the present disclosure. The imaging device includes an image capturing lens system (not otherwise herein labeled) of the present disclosure and an image sensor 480. FIG. 4B shows spherical aberration curves, astigmatic field curves and a distortion curve of the image capturing lens system according to the 4th embodiment. In FIG. 4A, the image capturing lens system includes, in order from an object side to an image side, an aperture stop 400, a first lens element 410, a second lens element 420, a third lens element 430, a fourth lens element 440, an IR-cut filter 450 and an image plane 470, wherein the image capturing lens system has a total of four lens elements (410-440) with refractive power.

The first lens element 410 with positive refractive power has a convex object-side surface 411 in a paraxial region thereof and a convex image-side surface 412 in a paraxial region thereof, and is made of plastic material. The object-side surface 411 and the image-side surface 412 of the first lens element 410 are aspheric.

The second lens element 420 with negative refractive power has a concave object-side surface 421 in a paraxial region thereof and a concave image-side surface 422 in a paraxial region thereof, and is made of plastic material. The object-side surface 421 and the image-side surface 422 of the second lens element 420 are aspheric. Furthermore, the image-side surface 422 of the second lens element 420 has at least one convex shape in an off-axis region thereof.

The third lens element 430 with positive refractive power has a concave object-side surface 431 in a paraxial region thereof and a convex image-side surface 432 in a paraxial region thereof, and is made of plastic material. The object-side surface 431 and the image-side surface 432 of the third lens element 430 are aspheric.

The fourth lens element 440 with negative refractive power has a convex object-side surface 441 in a paraxial region thereof and a concave image-side surface 442 in a paraxial region thereof, and is made of plastic material. The object-side surface 441 and the image-side surface 442 of the fourth lens element 440 are aspheric. Furthermore, the image-side surface 442 of the fourth lens element 440 has at least one convex shape in an off-axis region thereof.

The second lens element 420 has the minimum central thickness amongst all lens elements of the image capturing lens system. The IR-cut filter 450 is made of glass and located between the fourth lens element 440 and the image plane 470, and will not affect the focal length of the image capturing lens system. The image sensor 480 is disposed on the image plane 470 of the image capturing lens system.

The detailed optical data of the 4th embodiment are shown in Table 7 and the aspheric surface data are shown in Table 8 below.

TABLE 7

4th Embodiment
f = 1.42 mm, Fno = 2.05, HFOV = 41.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.003 | | | | |
| 2 | Lens 1 | 2.394 | ASP | 0.442 | Plastic | 1.544 | 55.9 | 1.60 |
| 3 | | −1.280 | ASP | 0.107 | | | | |
| 4 | Lens 2 | −26.847 | ASP | 0.180 | Plastic | 1.650 | 21.4 | −2.47 |
| 5 | | 1.714 | ASP | 0.108 | | | | |
| 6 | Lens 3 | −1.102 | ASP | 0.529 | Plastic | 1.544 | 55.9 | 1.01 |
| 7 | | −0.428 | ASP | 0.050 | | | | |
| 8 | Lens 4 | 0.575 | ASP | 0.200 | Plastic | 1.583 | 30.2 | −1.67 |
| 9 | | 0.315 | ASP | 0.400 | | | | |
| 10 | IR-cut filter | Plano | | 0.175 | Glass | 1.517 | 64.2 | — |
| 11 | | Plano | | 0.271 | | | | |
| 12 | Image | Plano | | — | | | | |

Note:
Reference wavelength is 587.6 nm (d-line).

TABLE 8

Aspheric Coefficients

| Surface # | 2 | 3 | 4 | 5 |
|---|---|---|---|---|
| k = | −1.3327E+01 | −1.8804E+01 | −4.5360E+01 | −1.6977E+01 |
| A4 = | −2.5596E−01 | −3.8773E+00 | −5.6942E+00 | −3.4251E+00 |
| A6 = | −3.8844E+00 | 1.6707E+01 | 1.5630E+01 | 1.3495E+01 |
| A8 = | 1.9764E+01 | −6.3535E+01 | 2.2688E+01 | −3.2433E+01 |
| A10 = | −1.3700E+02 | 7.4206E+01 | −4.6086E+02 | 3.1527E+01 |
| A12 = | | | 1.1200E+03 | |

| Surface # | 6 | 7 | 8 | 9 |
|---|---|---|---|---|
| k = | −4.8234E+00 | −1.7300E+00 | −1.1917E+01 | −4.0671E+00 |
| A4 = | −2.6386E−02 | −3.8649E−01 | 2.3231E−01 | −3.1153E−01 |
| A6 = | −8.1585E+00 | 3.7409E+00 | −1.9964E+00 | −2.2487E−02 |
| A8 = | 7.3462E+01 | −2.6194E+01 | 3.5556E+00 | 4.4831E−01 |
| A10 = | −2.3694E+02 | 8.1856E+01 | −2.6833E+00 | −5.8636E−01 |
| A12 = | 3.8596E+02 | −9.5057E+01 | −1.1384E−01 | 3.1038E−01 |
| A14 = | −3.1395E+02 | 3.6333E+01 | 9.4526E−01 | −7.2206E−02 |
| A16 = | 9.9057E+01 | | −2.7282E−01 | 6.1237E−03 |

In the image capturing lens system according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following conditions:

| 4th Embodiment | | | |
|---|---|---|---|
| f [mm] | 1.42 | (R3 + R4)/(R3 − R4) | 0.88 |
| Fno | 2.05 | 1/|tan(FOV)| | 0.13 |
| HFOV [deg.] | 41.3 | f/R4 | 0.83 |
| (V1 + V3)/(V2 + V4) | 2.17 | (T12 + T23 + T34)/Td | 0.17 |
| Td [mm] | 1.60 | CTmin [mm] | 0.18 |
| TL/ImgH | 1.90 | R5/R6 | 2.57 |
| R2/f | −0.90 | N4 | 1.58 |

5th Embodiment

Figure 5A:
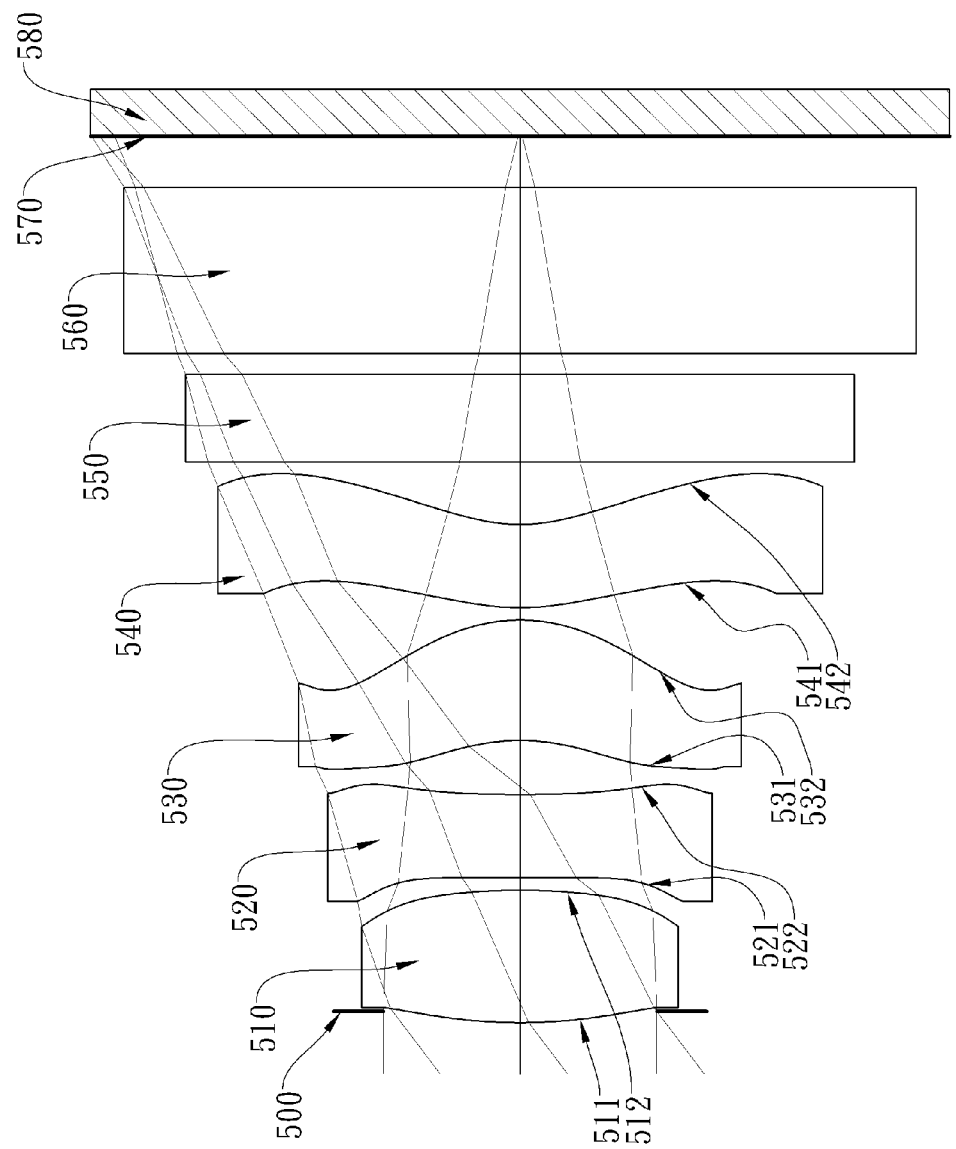
FIG. 5A is a schematic view of an imaging device according to the 5th embodiment of the present disclosure.
Figure 5B:
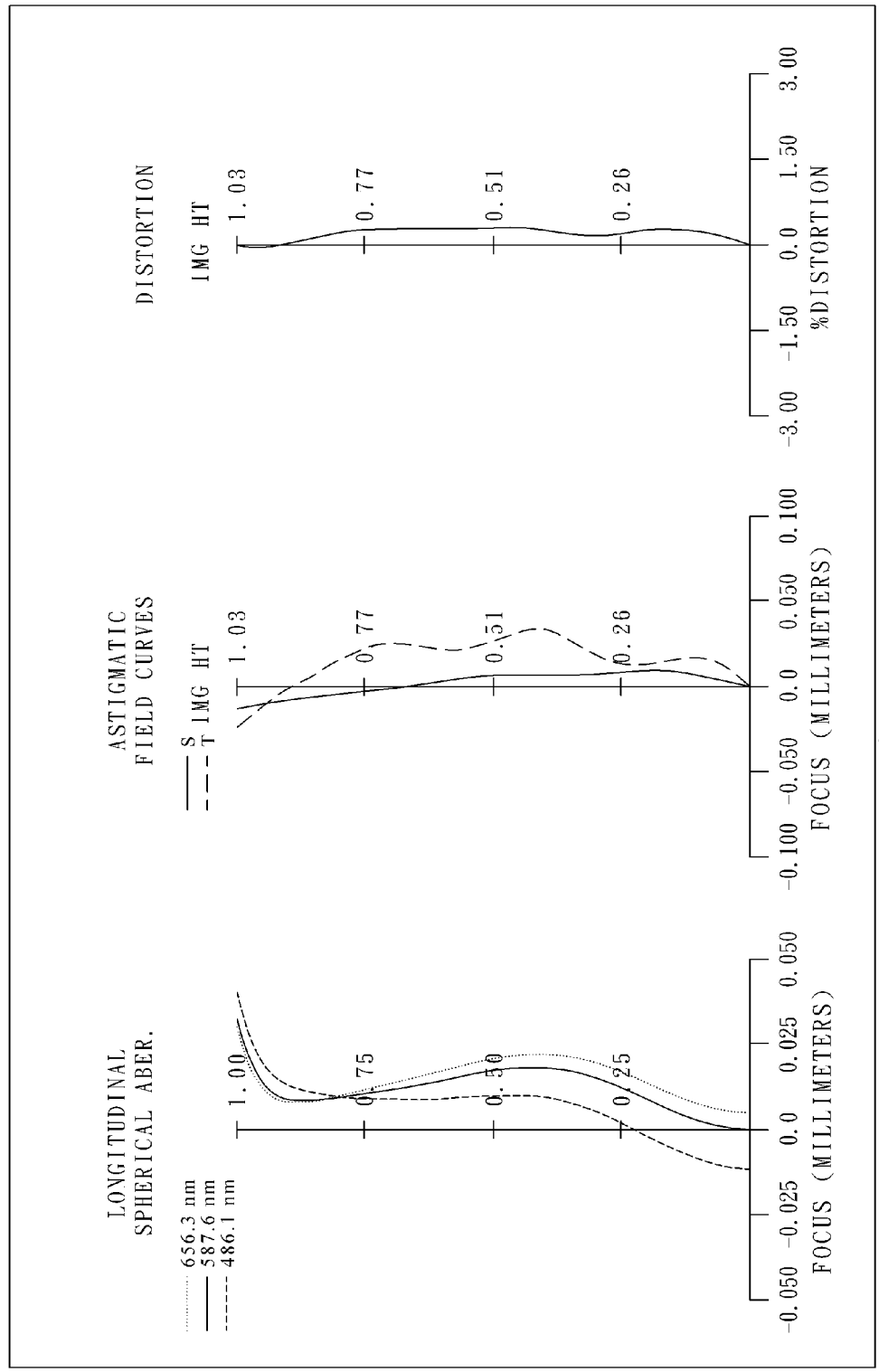
FIG. 5B shows spherical aberration curves, astigmatic field curves and a distortion curve of the imaging device according to the 5th embodiment.

FIG. 5A is a schematic view of an imaging device according to the 5th embodiment of the present disclosure. The imaging device includes an image capturing lens system (not otherwise herein labeled) of the present disclosure and an image sensor 580. FIG. 5B shows spherical aberration curves, astigmatic field curves and a distortion curve of the image capturing lens system according to the 5th embodiment. In FIG. 5A, the image capturing lens system includes, in order from an object side to an image side, an aperture stop 500, a first lens element 510, a second lens element 520, a third lens element 530, a fourth lens element 540, an IR-cut filter 550 and an image plane 570, wherein the image capturing lens system has a total of four lens elements (510-540) with refractive power.

The first lens element 510 with positive refractive power has a convex object-side surface 511 in a paraxial region thereof and a convex image-side surface 512 in a paraxial region thereof, and is made of plastic material. The object-side surface 511 and the image-side surface 512 of the first lens element 510 are aspheric.

The second lens element 520 with negative refractive power has a concave object-side surface 521 in a paraxial region thereof and a concave image-side surface 522 in a paraxial region thereof, and is made of plastic material. The object-side surface 521 and the image-side surface 522 of the second lens element 520 are aspheric. Furthermore, the image-side surface 522 of the second lens element 520 has at least one convex shape in an off-axis region thereof.

The third lens element 530 with positive refractive power has a concave object-side surface 531 in a paraxial region thereof and a convex image-side surface 532 in a paraxial region thereof, and is made of plastic material. The object-side surface 531 and the image-side surface 532 of the third lens element 530 are aspheric.

The fourth lens element 540 with negative refractive power has a convex object-side surface 541 in a paraxial region thereof and a concave image-side surface 542 in a paraxial region thereof, and is made of plastic material. The object-side surface 541 and the image-side surface 542 of the fourth lens element 540 are aspheric. Furthermore, the image-side surface 542 of the fourth lens element 540 has at least one convex shape in an off-axis region thereof.

The second lens element 520 and the fourth lens element 540 have the minimum central thickness amongst all lens elements of the image capturing lens system. The IR-cut filter 550 is made of glass and located between the fourth lens element 540 and the image plane 570, and will not affect the focal length of the image capturing lens system. The image capturing lens system include a cover glass 560 disposed between the IR-cut filter 550 and an image plane 570. The image sensor 580 is disposed on the image plane 570 of the image capturing lens system.

The detailed optical data of the 5th embodiment are shown in Table 9 and the aspheric surface data are shown in Table 10 below.

TABLE 9

5th Embodiment
f = 1.35 mm, Fno = 2.05, HFOV = 37.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.027 | | | | |
| 2 | Lens 1 | 1.217 | ASP | 0.318 | Plastic | 1.544 | 55.9 | 1.31 |
| 3 | | −1.563 | ASP | 0.030 | | | | |
| 4 | Lens 2 | −37.214 | ASP | 0.200 | Plastic | 1.650 | 23.3 | −5.45 |
| 5 | | 3.857 | ASP | 0.130 | | | | |
| 6 | Lens 3 | −0.493 | ASP | 0.289 | Plastic | 1.544 | 55.9 | 2.46 |
| 7 | | −0.435 | ASP | 0.030 | | | | |
| 8 | Lens 4 | 0.561 | ASP | 0.200 | Plastic | 1.640 | 23.3 | −4.35 |
| 9 | | 0.402 | ASP | 0.150 | | | | |
| 10 | IR-cut filter | Plano | | 0.210 | Glass | 1.517 | 64.2 | — |
| 11 | | Plano | | 0.050 | | | | |
| 12 | Cover-glass | Plano | | 0.400 | Glass | 1.517 | 64.2 | — |
| 13 | | Plano | | 0.122 | | | | |
| 14 | Image | Plano | | — | | | | |

Note:
Reference wavelength is 587.6 nm (d-line).
The effective radius of Surface 4 is 0.390 mm.

TABLE 10

Aspheric Coefficients

| Surface # | 2 | 3 | 4 | 5 |
|---|---|---|---|---|
| k = | −1.6789E+00 | −4.1546E+01 | −9.0002E+01 | −9.0000E+01 |
| A4 = | −2.0295E−01 | −7.1793E−01 | 9.8945E−01 | 1.4496E+00 |
| A6 = | −4.4777E+00 | −1.6358E+00 | −1.1469E+01 | 1.6106E+01 |
| A8 = | 4.7497E+01 | −1.3385E+02 | −4.6447E+02 | −3.1661E+02 |
| A10 = | −3.9472E+02 | 1.7249E+03 | 3.4339E+03 | 1.7063E+03 |
| A12 = | | −4.4650E+03 | −4.9191E+03 | −6.4973E+03 |
| A14 = | | | −3.6095E+03 | 1.3569E+04 |

| Surface # | 6 | 7 | 8 | 9 |
|---|---|---|---|---|
| k = | −1.0119E+01 | −5.1195E+00 | −1.3882E+01 | −5.7677E+00 |
| A4 = | −5.8921E+00 | −9.7212E+00 | −1.2841E+00 | −1.3963E+00 |
| A6 = | 1.1501E+02 | 1.4512E+02 | 1.0817E+01 | 6.8899E+00 |
| A8 = | −8.8357E+02 | −1.4010E+03 | −6.9051E+01 | −2.8442E+01 |
| A10 = | 6.3861E+03 | 9.0959E+03 | 2.2074E+02 | 6.8633E+01 |
| A12 = | −4.2817E+04 | −3.5312E+04 | −3.6390E+02 | −9.6553E+01 |
| A14 = | 1.5755E+05 | 7.5513E+04 | 2.4317E+02 | 7.2234E+01 |
| A16 = | −2.1749E+05 | −6.9222E+04 | | −2.2115E+01 |

In the image capturing lens system according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following conditions:

| 5th Embodiment | | | |
|---|---|---|---|
| f [mm] | 1.35 | (R3 + R4)/(R3 − R4) | 0.81 |
| Fno | 2.05 | 1/|tan(FOV)| | 0.28 |
| HFOV [deg.] | 37.2 | f/R4 | 0.35 |
| (V1 + V3)/(V2 + V4) | 2.40 | (T12 + T23 + T34)/Td | 0.16 |
| Td [mm] | 1.20 | CTmin [mm] | 0.20 |
| TL/ImgH | 2.07 | R5/R6 | 1.13 |
| R2/f | −1.16 | N4 | 1.64 |

6th Embodiment

Figure 6A:
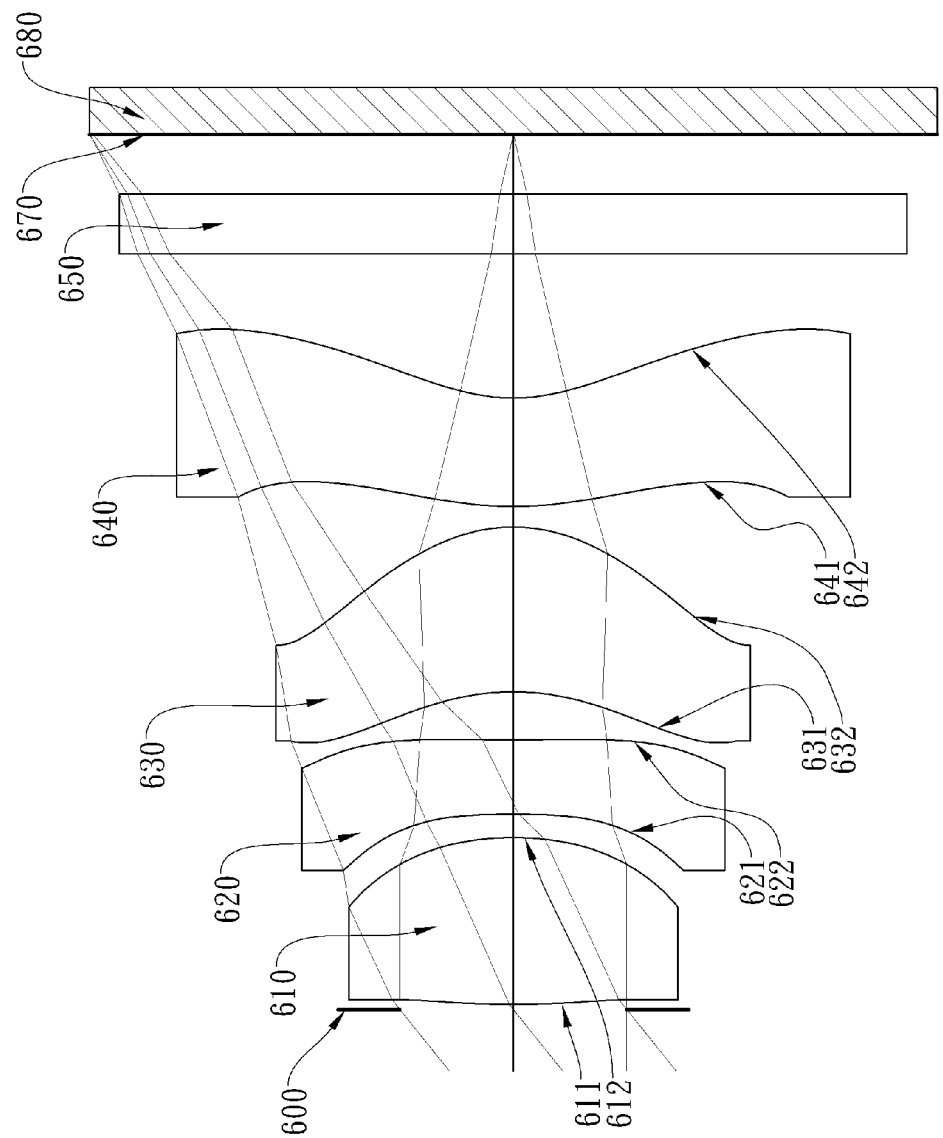
FIG. 6A is a schematic view of an imaging device according to the 6th embodiment of the present disclosure.
Figure 6B:
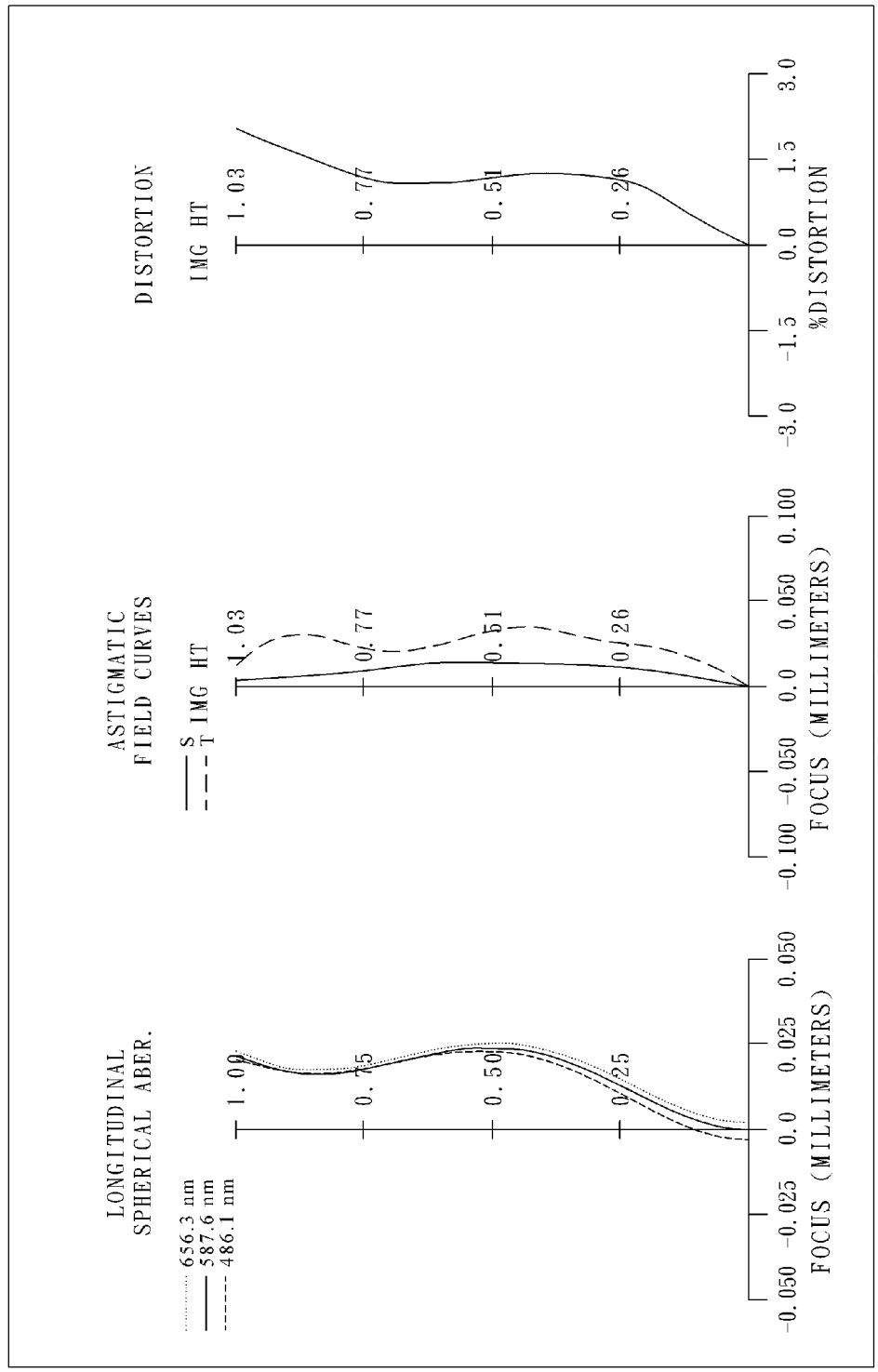
FIG. 6B shows spherical aberration curves, astigmatic field curves and a distortion curve of the imaging device according to the 6th embodiment.

FIG. 6A is a schematic view of an imaging device according to the 6th embodiment of the present disclosure. The imaging device includes an image capturing lens system (not otherwise herein labeled) of the present disclosure and an image sensor 680. FIG. 6B shows spherical aberration curves, astigmatic field curves and a distortion curve of the image capturing lens system according to the 6th embodiment. In FIG. 6A, the image capturing lens system includes, in order from an object side to an image side, an aperture stop 600, a first lens element 610, a second lens element 620, a third lens element 630, a fourth lens element 640, an IR-cut filter 650 and an image plane 670, wherein the image capturing lens system has a total of four lens elements (610-640) with refractive power.

The first lens element 610 with positive refractive power has a convex object-side surface 611 in a paraxial region thereof and a convex image-side surface 612 in a paraxial region thereof, and is made of plastic. The object-side surface 611 and the image-side surface 612 of the first lens element 610 are aspheric.

The second lens element 620 with negative refractive power has a concave object-side surface 621 in a paraxial region thereof and a concave image-side surface 622 in a paraxial region thereof, and is made of plastic material. The object-side surface 621 and the image-side surface 622 of the second lens element 620 are aspheric. Furthermore, the image-side surface 622 of the second lens element 620 has at least one convex shape in an off-axis region thereof.

The third lens element 630 with positive refractive power has a concave object-side surface 631 in a paraxial region thereof and a convex image-side surface 632 in a paraxial region thereof, and is made of plastic material. The object-side surface 631 and the image-side surface 632 of the third lens element 630 are aspheric.

The fourth lens element 640 with negative refractive power has a convex object-side surface 641 in a paraxial region thereof and a concave image-side surface 642 in a paraxial region thereof, and is made of plastic material. The object-side surface 641 and the image-side surface 642 of the fourth lens element 640 are aspheric. Furthermore, the image-side surface 642 of the fourth lens element 640 has at least one convex shape in an off-axis region thereof.

The second lens element 620 has the minimum central thickness amongst all lens elements of the image capturing lens system. The IR-cut filter 650 is made of glass and located between the fourth lens element 640 and the image plane 670, and will not affect the focal length of the image capturing lens system. The image sensor 680 is disposed on the image plane 670 of the image capturing lens system.

The detailed optical data of the 6th embodiment are shown in Table 11 and the aspheric surface data are shown in Table 12 below.

TABLE 11

6th Embodiment
f = 1.24 mm, Fno = 2.25, HFOV = 38.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.012 | | | | |
| 2 | Lens 1 | 2.051 | ASP | 0.405 | Plastic | 1.544 | 55.9 | 1.06 |
| 3 | | −0.748 | ASP | 0.057 | | | | |
| 4 | Lens 2 | −2.316 | ASP | 0.180 | Plastic | 1.634 | 23.8 | −2.39 |
| 5 | | 4.518 | ASP | 0.117 | | | | |
| 6 | Lens 3 | −0.610 | ASP | 0.400 | Plastic | 1.544 | 55.9 | 1.25 |
| 7 | | −0.396 | ASP | 0.050 | | | | |
| 8 | Lens 4 | 0.865 | ASP | 0.263 | Plastic | 1.650 | 21.4 | −1.82 |
| 9 | | 0.440 | ASP | 0.350 | | | | |
| 10 | IR-cut filter | Plano | | 0.145 | Glass | 1.517 | 64.2 | — |
| 11 | | Plano | | 0.145 | | | | |
| 12 | Image | Plano | | — | | | | |

Note:
Reference wavelength is 587.6 nm (d-line).

TABLE 12

Aspheric Coefficients

| Surface # | 2 | 3 | 4 | 5 |
|---|---|---|---|---|
| k = | −1.0034E+01 | −2.2871E+01 | −3.6193E+01 | −3.6316E+00 |
| A4 = | −6.8367E−01 | −8.5271E+00 | −4.9048E+00 | −2.3696E+00 |
| A6 = | −3.6059E+00 | 5.9000E+01 | −1.0645E+01 | 1.0537E+01 |
| A8 = | 1.8190E+01 | −2.7152E+02 | 3.9650E+02 | −5.0223E+01 |
| A10 = | −5.2547E+02 | 4.0324E+02 | −2.9427E+03 | 9.1365E+01 |
| A12 = | | | 7.2078E+03 | |
| A14 = | | | 1.4279E−06 | |

| Surface # | 6 | 7 | 8 | 9 |
|---|---|---|---|---|
| k = | −1.8155E+00 | −1.4470E+00 | −1.8860E+01 | −3.5665E+00 |
| A4 = | −1.1910E+00 | −9.5195E−01 | 5.4425E−01 | −1.2959E+00 |
| A6 = | 3.0720E+01 | 1.0847E+01 | −8.6384E+00 | 3.1408E+00 |
| A8 = | −2.3938E+02 | −6.8035E+01 | 3.6350E+01 | −4.8923E+00 |
| A10 = | 1.0917E+03 | 2.5918E+02 | −8.3214E+01 | 4.0416E+00 |

TABLE 12-continued

Aspheric Coefficients

| A12 = | −2.6764E+03 | −4.0464E+02 | 9.8023E+01 | −1.7090E+00 |
|---|---|---|---|---|
| A14 = | 3.2578E+03 | 2.1115E+02 | −5.6062E+01 | 3.5197E−01 |
| A16 = | −1.5259E+03 | | 1.2328E+01 | −2.8045E−02 |

In the image capturing lens system according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following conditions:

| 6th Embodiment | | | |
|---|---|---|---|
| f [mm] | 1.24 | (R3 + R4)/(R3 − R4) | −0.32 |
| Fno | 2.25 | 1/|tan(FOV)| | 0.22 |
| HFOV [deg.] | 38.8 | f/R4 | 0.27 |
| (V1 + V3)/(V2 + V4) | 2.47 | (T12 + T23 + T34)/Td | 0.15 |
| Td [mm] | 1.47 | CTmin [mm] | 0.18 |
| TL/ImgH | 2.05 | R5/R6 | 1.54 |
| R2/f | −0.60 | N4 | 1.65 |

7th Embodiment

Figure 7A:
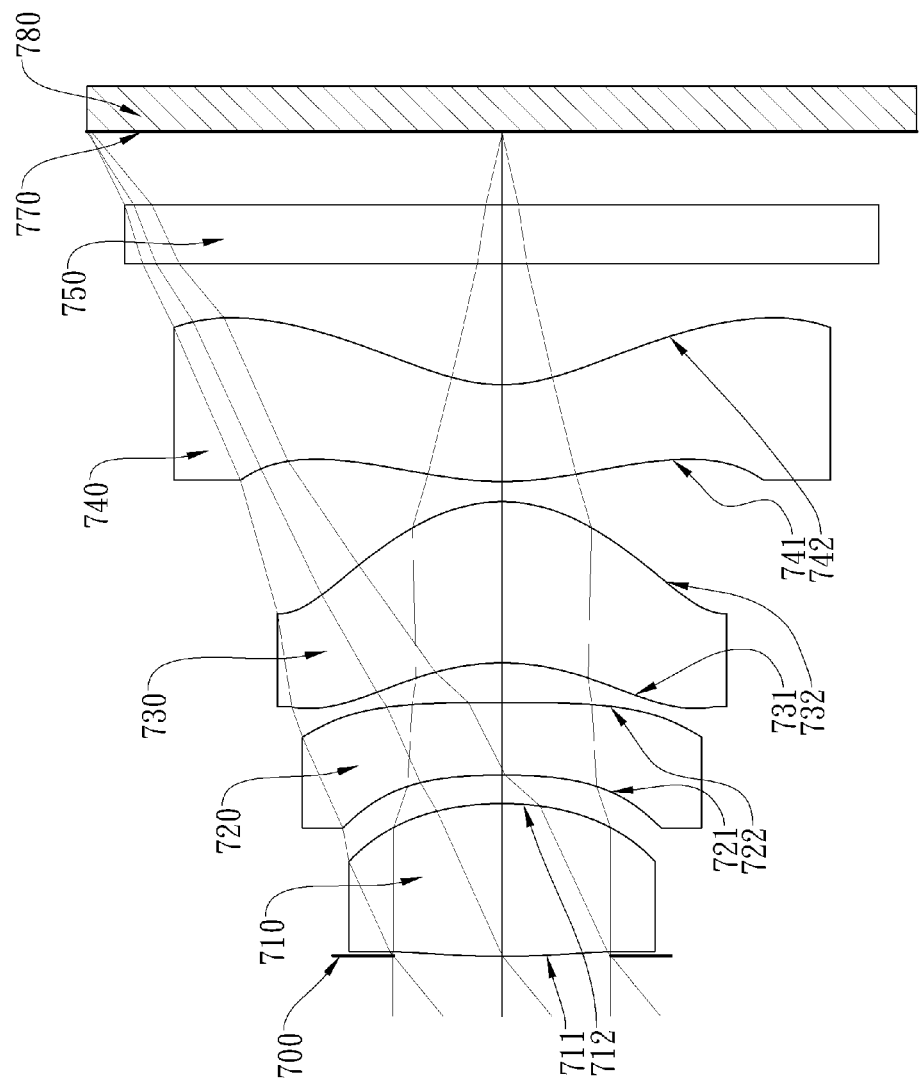
FIG. 7A is a schematic view of an imaging device according to the 7th embodiment of the present disclosure.
Figure 7B:
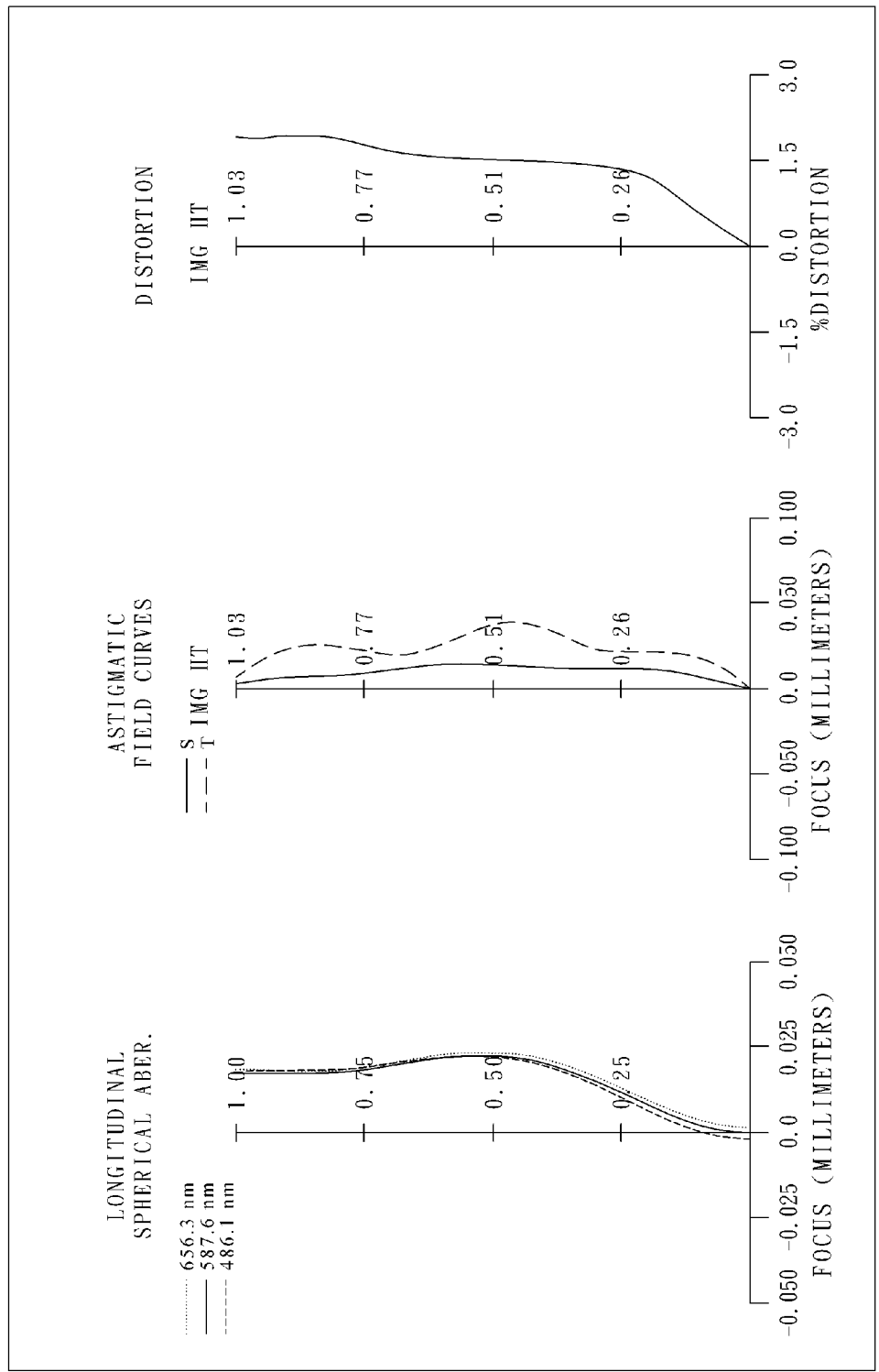
FIG. 7B shows spherical aberration curves, astigmatic field curves and a distortion curve of the imaging device according to the 7th embodiment.

FIG. 7A is a schematic view of an imaging device according to the 7th embodiment of the present disclosure. The imaging device includes an image capturing lens system (not otherwise herein labeled) of the present disclosure and an image sensor 780. FIG. 7B shows spherical aberration curves, astigmatic field curves and a distortion curve of the image capturing lens system according to the 7th embodiment. In FIG. 7A, the image capturing lens system includes, in order from an object side to an image side, an aperture stop 700, a first lens element 710, a second lens element 720, a third lens element 730, a fourth lens element 740, an IR-cut filter 750 and an image plane 770, wherein the image capturing lens system has a total of four lens elements (710-740) with refractive power.

The first lens element 710 with positive refractive power has a convex object-side surface 711 in a paraxial region thereof and a convex image-side surface 712 in a paraxial region thereof, and is made of glass material. The object-side surface 711 and the image-side surface 712 of the first lens element 710 are aspheric.

The second lens element 720 with negative refractive power has a concave object-side surface 721 in a paraxial region thereof and a convex image-side surface 722 in a paraxial region thereof, and is made of plastic material. The object-side surface 721 and the image-side surface 722 of the second lens element 720 are aspheric.

The third lens element 730 with positive refractive power has a concave object-side surface 731 in a paraxial region thereof and a convex image-side surface 732 in a paraxial region thereof, and is made of plastic material. The object-side surface 731 and the image-side surface 732 of the third lens element 730 are aspheric.

The fourth lens element 740 with negative refractive power has a convex object-side surface 741 in a paraxial region thereof and a concave image-side surface 742 in a paraxial region thereof, and is made of plastic material. The object-side surface 741 and the image-side surface 742 of the fourth lens element 740 are aspheric. Furthermore, the image-side surface 742 of the fourth lens element 740 has at least one convex shape in an off-axis region thereof.

The second lens element 720 has the minimum central thickness amongst all lens elements of the image capturing lens system. The IR-cut filter 750 is made of glass and located between the fourth lens element 740 and the image plane 770, and will not affect the focal length of the image capturing lens system. The image sensor 780 is disposed on the image plane 770 of the image capturing lens system.

The detailed optical data of the 7th embodiment are shown in Table 13 and the aspheric surface data are shown in Table 14 below.

TABLE 13

7th Embodiment
f = 1.21 mm, Fno = 2.25, HFOV = 39.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.002 | | | | |
| 2 | Lens 1 | 1.964 | ASP | 0.379 | Plastic | 1.542 | 62.9 | 1.07 |
| 3 | | −0.764 | ASP | 0.071 | | | | |
| 4 | Lens 2 | −1.605 | ASP | 0.180 | Plastic | 1.633 | 23.4 | −2.77 |
| 5 | | −20.135 | ASP | 0.098 | | | | |
| 6 | Lens 3 | −0.600 | ASP | 0.400 | Plastic | 1.514 | 56.8 | 1.20 |
| 7 | | −0.372 | ASP | 0.050 | | | | |
| 8 | Lens 4 | 0.786 | ASP | 0.240 | Plastic | 1.633 | 23.4 | −1.61 |
| 9 | | 0.392 | ASP | 0.300 | | | | |
| 10 | IR-cut filter | Plano | | 0.145 | Glass | 1.517 | 64.2 | — |
| 11 | | Plano | | 0.183 | | | | |
| 12 | Image | Plano | | — | | | | |

Note:
Reference wavelength is 587.6 nm (d-line).

TABLE 14

Aspheric Coefficients

| Surface # | 2 | 3 | 4 | 5 |
|---|---|---|---|---|
| k = | −1.0034E+01 | −2.2871E+01 | −2.7875E+01 | −4.9190E+01 |
| A4 = | −7.2843E−01 | −7.4869E+00 | −4.1759E+00 | −1.9226E+00 |
| A6 = | −2.9183E+00 | 4.8449E+01 | −1.3019E+01 | 9.6663E+00 |
| A8 = | −4.9097E+00 | −2.5211E+02 | 3.1822E+02 | −5.4791E+01 |
| A10 = | −4.0115E+02 | 4.6588E+02 | −2.5505E+03 | 1.0263E+02 |

TABLE 14-continued

Aspheric Coefficients

| A12 = | 7.2078E+03 |
| A14 = | 6.2650E−07 |

| Surface # | 6 | 7 | 8 | 9 |
|---|---|---|---|---|
| k = | −2.0080E+00 | −1.4562E+00 | −1.8860E+01 | −3.5665E+00 |
| A4 = | −1.3068E+00 | −8.2708E−01 | 6.9571E−01 | −1.3961E+00 |
| A6 = | 2.8009E+01 | 1.0785E+01 | −1.2704E+01 | 3.3601E+00 |
| A8 = | −1.6558E+02 | −8.0473E+01 | 6.0118E+01 | −5.0612E+00 |
| A10 = | 6.2555E+02 | 3.5698E+02 | −1.5400E+02 | 3.3510E+00 |
| A12 = | −1.3654E+03 | −6.2098E+02 | 2.0335E+02 | −4.1787E−01 |
| A14 = | 1.5131E+03 | 3.5265E+02 | −1.2947E+02 | −3.7943E−01 |
| A16 = | −6.5770E+02 | | 3.1304E+01 | 9.0462E−02 |

In the image capturing lens system according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following conditions:

7th Embodiment

| f [mm] | 1.21 | (R3 + R4)/(R3 − R4) | −1.17 |
|---|---|---|---|
| Fno | 2.25 | 1/|tan(FOV)| | 0.20 |
| HFOV [deg.] | 39.4 | f/R4 | −0.06 |
| (V1 + V3)/(V2 + V4) | 2.56 | (T12 + T23 + T34)/Td | 0.15 |
| Td [mm] | 1.42 | CTmin [mm] | 0.18 |
| TL/ImgH | 1.99 | R5/R6 | 1.61 |
| R2/f | −0.63 | N4 | 1.63 |

8th Embodiment

Figure 8A:
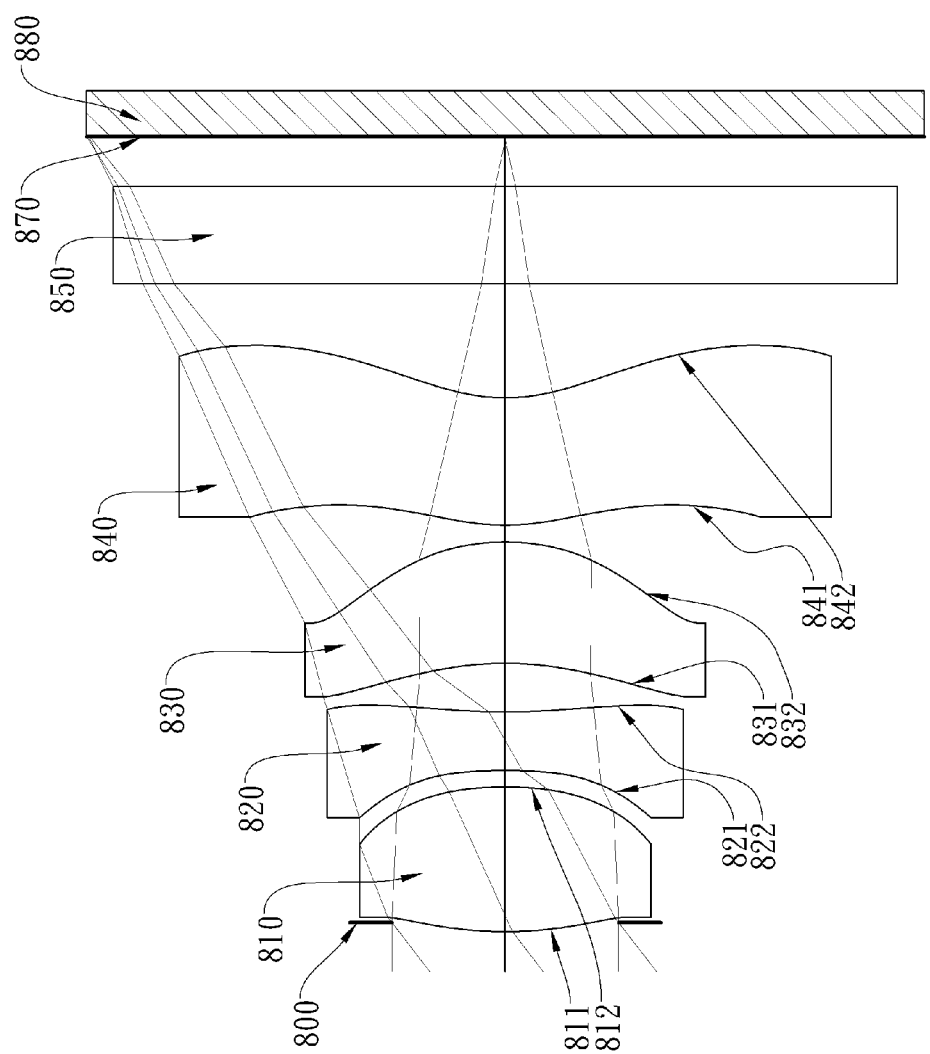
FIG. 8A is a schematic view of an imaging device according to the 8th embodiment of the present disclosure.
Figure 8B:
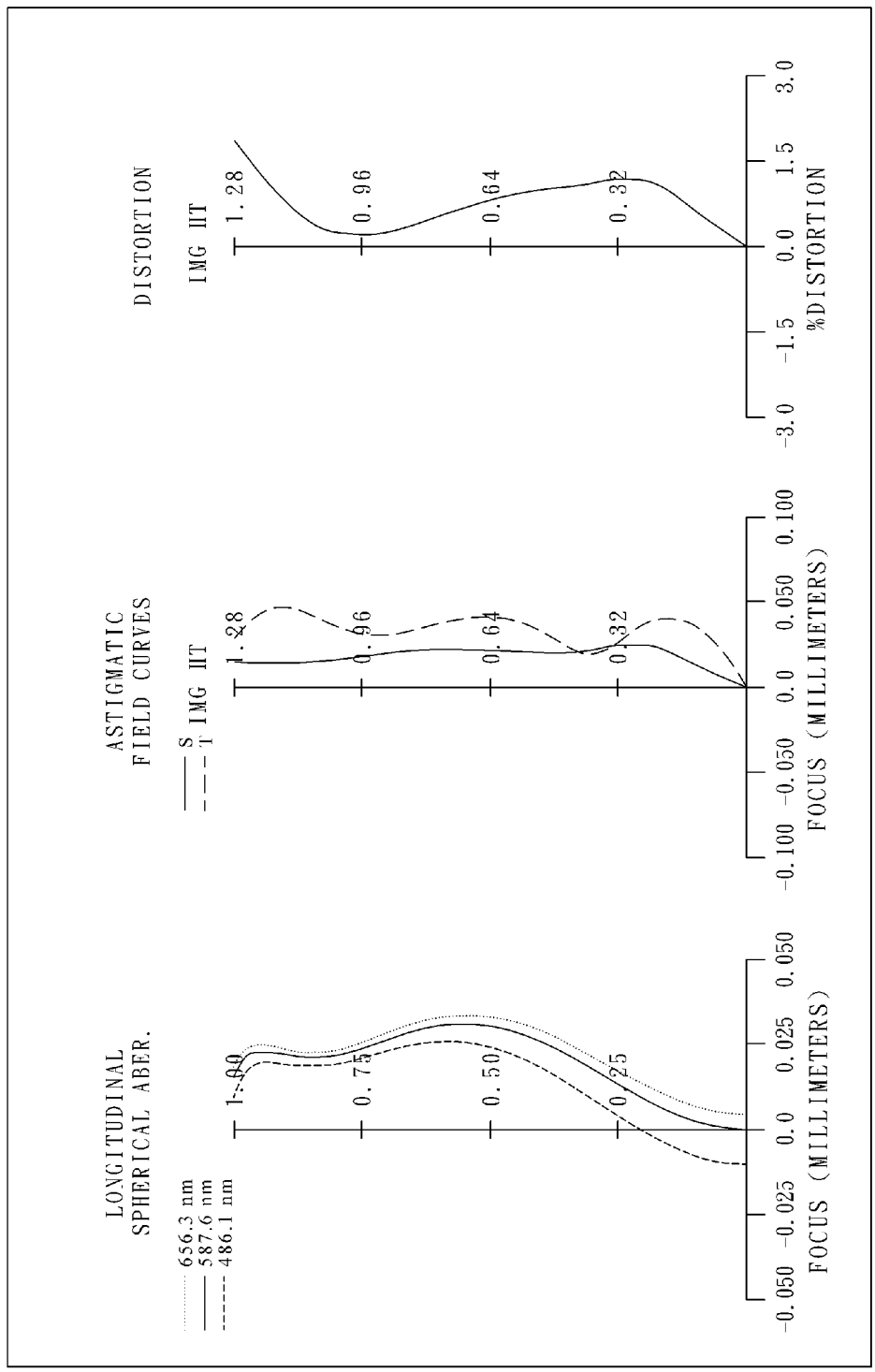
FIG. 8B shows spherical aberration curves, astigmatic field curves and a distortion curve of the imaging device according to the 8th embodiment.

FIG. 8A is a schematic view of an imaging device according to the 8th embodiment of the present disclosure. The imaging device includes an image capturing lens system (not otherwise herein labeled) of the present disclosure and an image sensor 880. FIG. 8B shows spherical aberration curves, astigmatic field curves and a distortion curve of the image capturing lens system according to the 8th embodiment. In FIG. 8A, the image capturing lens system includes, in order from an object side to an image side, an aperture stop 800, a first lens element 810, a second lens element 820, a third lens element 830, a fourth lens element 840, an IR-cut filter 850 and an image plane 870, wherein the image capturing lens system has a total of four lens elements (810-840) with refractive power.

The first lens element 810 with positive refractive power has a convex object-side surface 811 in a paraxial region thereof and a convex image-side surface 812 in a paraxial region thereof, and is made of plastic material. The object-side surface 811 and the image-side surface 812 of the first lens element 810 are aspheric.

The second lens element 820 with negative refractive power has a concave object-side surface 821 in a paraxial region thereof and a concave image-side surface 822 in a paraxial region thereof, and is made of plastic material. The object-side surface 821 and the image-side surface 822 of the second lens element 820 are aspheric. Furthermore, the image-side surface 822 of the second lens element 820 has at least one convex shape in an off-axis region thereof.

The third lens element 830 with positive refractive power has a concave object-side surface 831 in a paraxial region thereof and a convex image-side surface 832 in a paraxial region thereof, and is made of plastic material. The object-side surface 831 and the image-side surface 832 of the third lens element 830 are aspheric.

The fourth lens element 840 with positive refractive power has a convex object-side surface 841 in a paraxial region thereof and a concave image-side surface 842 in a paraxial region thereof, and is made of plastic material. The object-side surface 841 and the image-side surface 842 of the fourth lens element 840 are aspheric. Furthermore, the image-side surface 842 of the fourth lens element 840 has at least one convex shape in an off-axis region thereof.

The second lens element 820 has the minimum central thickness amongst all lens elements of the image capturing lens system. The IR-cut filter 850 is made of glass and located between the fourth lens element 840 and the image plane 870, and will not affect the focal length of the image capturing lens system. The image sensor 880 is disposed on the image plane 870 of the image capturing lens system.

The detailed optical data of the 8th embodiment are shown in Table 15 and the aspheric surface data are shown in Table 16 below.

TABLE 16

Aspheric Coefficients

| Surface # | 2 | 3 | 4 | 5 |
|---|---|---|---|---|
| k = | −1.0761E+01 | −2.2083E+01 | −2.8416E+01 | −4.9879E+01 |
| A4 = | 6.5658E−01 | −4.5729E+00 | −4.6175E+00 | −3.7268E−01 |
| A6 = | −7.4461E+00 | 1.9091E+01 | 1.6271E+01 | 3.6376E−01 |
| A8 = | 4.9768E+01 | −6.1712E+01 | −6.9946E+01 | −2.2339E+00 |
| A10 = | −2.7285E+02 | 3.4943E+01 | 5.1243E+02 | 3.4025E−01 |
| A12 = | | | −2.7656E+03 | |
| A14 = | | | 5.7177E+03 | |

| Surface # | 6 | 7 | 8 | 9 |
|---|---|---|---|---|
| k = | −2.1111E+00 | −1.0312E+00 | −1.1875E+01 | −3.1264E+00 |
| A4 = | 1.4015E+00 | −3.6295E+00 | −8.9434E−01 | −1.2229E+00 |
| A6 = | −1.0177E+01 | 3.0019E+01 | 1.1063E+00 | 2.7311E+00 |
| A8 = | 5.4947E+01 | −1.4551E+02 | −8.5947E−01 | −4.4207E+00 |
| A10 = | −2.2118E+02 | 3.9987E+02 | 1.7394E+00 | 4.6408E+00 |
| A12 = | 6.5704E+02 | −5.0400E+02 | −3.3564E+00 | −2.8990E+00 |
| A14 = | −1.0523E+03 | 2.2633E+02 | 2.5422E+00 | 9.3393E−01 |
| A16 = | 6.0774E+02 | | −6.2829E−01 | −1.1294E−01 |

In the image capturing lens system according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following conditions:

| 8th Embodiment | | | |
|---|---|---|---|
| f [mm] | 1.61 | (R3 + R4)/(R3 − R4) | 0.05 |
| Fno | 2.32 | 1/|tan(FOV)| | 0.26 |
| HFOV [deg.] | 37.7 | f/R4 | 0.84 |
| (V1 + V3)/(V2 + V4) | 1.88 | (T12 + T23 + T34)/Td | 0.15 |
| Td [mm] | 1.64 | CTmin [mm] | 0.18 |
| TL/ImgH | 1.90 | R5/R6 | 1.20 |
| R2/f | −0.68 | N4 | 1.58 |

9th Embodiment

Figure 9A:
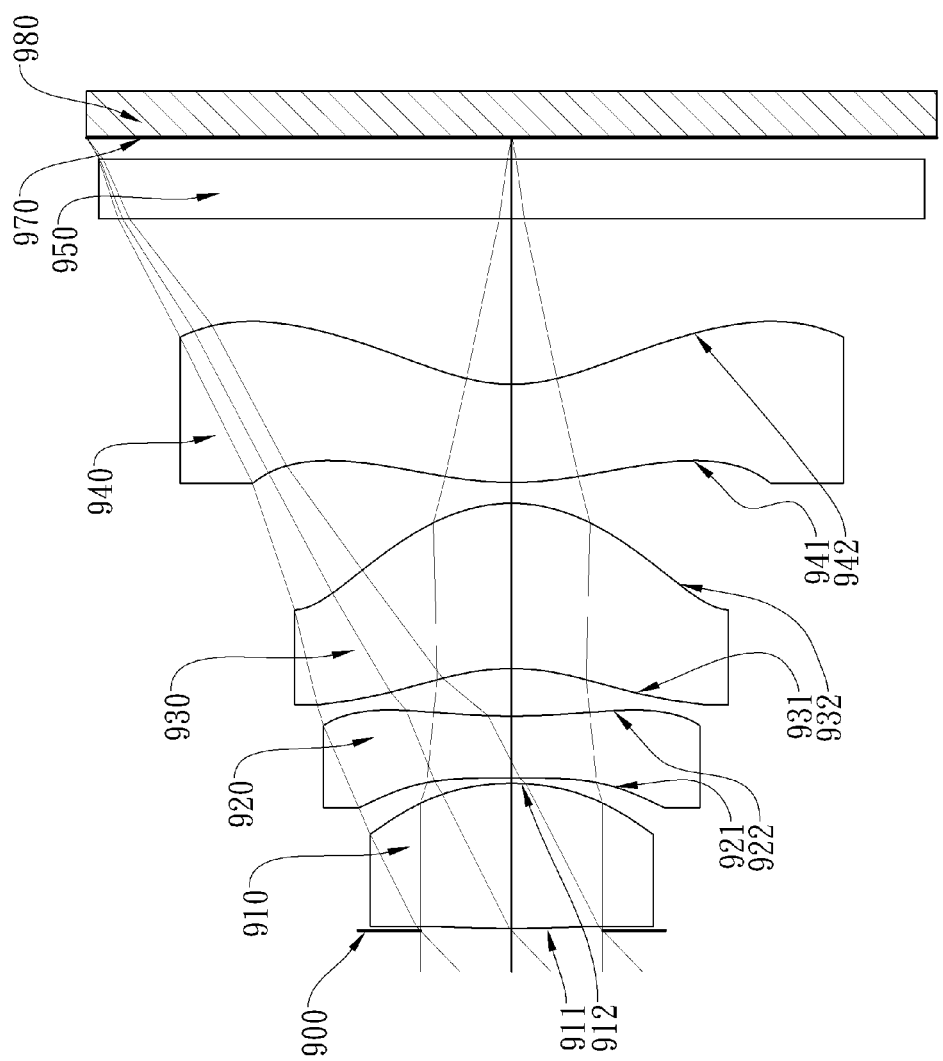
FIG. 9A is a schematic view of an imaging device according to the 9th embodiment of the present disclosure.

FIG. 9A is a schematic view of an imaging device according to the 9th embodiment of the present disclosure. The

TABLE 15

8th Embodiment
f = 1.61 mm, Fno = 2.32, HFOV = 37.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.028 | | | | |
| 2 | Lens 1 | 1.186 | ASP | 0.445 | Plastic | 1.514 | 56.8 | 1.19 |
| 3 | | −1.100 | ASP | 0.050 | | | | |
| 4 | Lens 2 | −2.126 | ASP | 0.180 | Plastic | 1.583 | 30.2 | −1.70 |
| 5 | | 1.920 | ASP | 0.150 | | | | |
| 6 | Lens 3 | −0.918 | ASP | 0.372 | Plastic | 1.514 | 56.8 | 4.94 |
| 7 | | −0.767 | ASP | 0.052 | | | | |
| 8 | Lens 4 | 0.652 | ASP | 0.391 | Plastic | 1.583 | 30.2 | 19.35 |
| 9 | | 0.539 | ASP | 0.350 | | | | |
| 10 | IR-cut filter | Plano | | 0.300 | Glass | 1.517 | 64.2 | — |
| 11 | | Plano | | 0.152 | | | | |
| 12 | Image | Plano | | — | | | | |

Figure 9B:
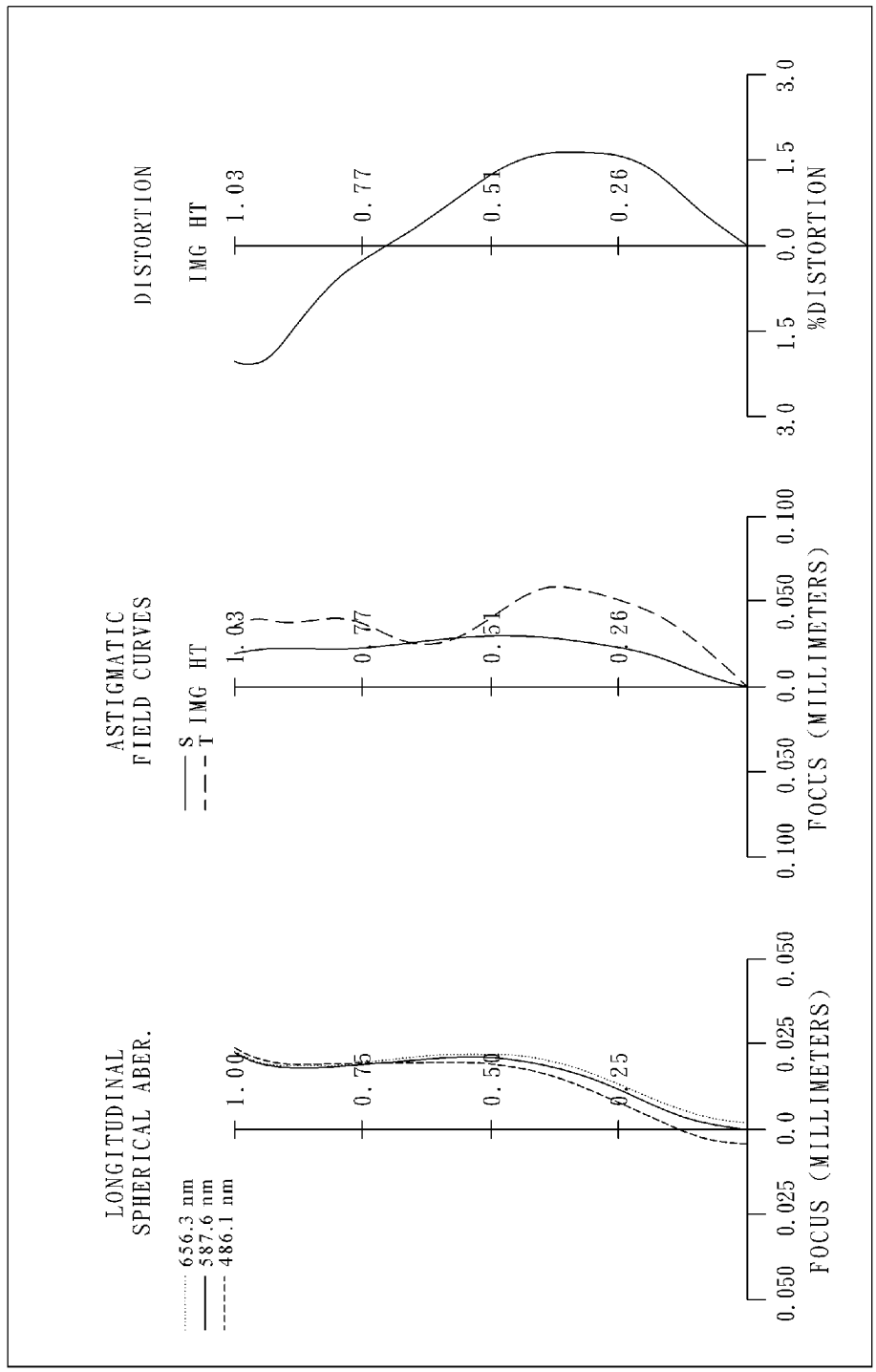
FIG. 9B shows spherical aberration curves, astigmatic field curves and a distortion curve of the imaging device according to the 9th embodiment.

Note:
Reference wavelength is 587.6 nm (d-line).

imaging device includes an image capturing lens system (not otherwise herein labeled) of the present disclosure and an image sensor 980. FIG. 9B shows spherical aberration curves, astigmatic field curves and a distortion curve of the image capturing lens system according to the 9th embodiment. In FIG. 9A, the image capturing lens system includes, in order from an object side to an image side, an aperture stop 900, a first lens element 910, a second lens element 920, a third lens element 930, a fourth lens element 940, an IR-cut filter 950 and an image plane 970, wherein the image capturing lens system has a total of four lens elements (910-940) with refractive power.

The first lens element 910 with positive refractive power has a convex object-side surface 911 in a paraxial region thereof and a convex image-side surface 912 in a paraxial region thereof, and is made of plastic material. The object-side surface 911 and the image-side surface 912 of the first lens element 910 are aspheric.

The second lens element 920 with negative refractive power has a concave object-side surface 921 in a paraxial region thereof and a concave image-side surface 922 in a paraxial region thereof, and is made of plastic material. The object-side surface 921 and the image-side surface 922 of the second lens element 920 are aspheric. Furthermore, the image-side surface 922 of the second lens element 920 has at least one convex shape in an off-axis region thereof.

The third lens element 930 with positive refractive power has a concave object-side surface 931 in a paraxial region thereof and a convex image-side surface 932 in a paraxial region thereof, and is made of plastic material. The object-side surface 931 and the image-side surface 932 of the third lens element 930 are aspheric.

The fourth lens element 940 with negative refractive power has a convex object-side surface 941 in a paraxial region thereof and a concave image-side surface 942 in a paraxial region thereof, and is made of plastic material. The object-side surface 941 and the image-side surface 942 of the fourth lens element 940 are aspheric. Furthermore, the image-side surface 942 of the fourth lens element 940 has at least one convex shape in an off-axis region thereof.

The second lens element 920 has the minimum central thickness amongst all lens elements of the image capturing lens system. The IR-cut filter 950 is made of glass and located between the fourth lens element 940 and the image plane 970, and will not affect the focal length of the image capturing lens system. The image sensor 980 is disposed on the image plane 970 of the image capturing lens system.

The detailed optical data of the 9th embodiment are shown in Table 17 and the aspheric surface data are shown in Table 18 below.

TABLE 17

9th Embodiment
f = 1.08 mm, Fno = 2.45, HFOV = 43.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.005 | | | | |
| 2 | Lens 1 | 3.007 | ASP | 0.351 | Plastic | 1.544 | 55.9 | 0.96 |
| 3 | | −0.607 | ASP | 0.013 | | | | |
| 4 | Lens 2 | −22.416 | ASP | 0.150 | Plastic | 1.634 | 23.8 | −2.48 |
| 5 | | 1.695 | ASP | 0.115 | | | | |
| 6 | Lens 3 | −0.558 | ASP | 0.400 | Plastic | 1.544 | 55.9 | 1.19 |
| 7 | | −0.376 | ASP | 0.050 | | | | |
| 8 | Lens 4 | 0.760 | ASP | 0.238 | Plastic | 1.634 | 23.8 | −1.81 |
| 9 | | 0.402 | ASP | 0.400 | | | | |
| 10 | IR-cut filter | Plano | | 0.145 | Glass | 1.517 | 64.2 | — |
| 11 | | Plano | | 0.051 | | | | |
| 12 | Image | Plano | | — | | | | |

Note:
Reference wavelength is 587.6 nm (d-line).

TABLE 18

Aspheric Coefficients

| Surface # | 2 | 3 | 4 | 5 |
|---|---|---|---|---|
| k = | −1.0034E+01 | −2.2871E+01 | 4.1715E+01 | −3.6316E+00 |
| A4 = | −1.5483E−01 | −1.4788E+01 | −5.8492E+00 | −6.7192E−01 |
| A6 = | −4.2982E+01 | 1.6714E+02 | −7.1804E+00 | −1.2857E+01 |
| A8 = | 6.8786E+02 | −1.1110E+03 | 4.2356E+02 | 6.2487E+01 |
| A10 = | −5.1269E+03 | 3.2094E+03 | −2.8529E+03 | −1.3940E+02 |
| A12 = | | | 7.2078E+03 | |
| A14 = | | | 2.6674E−06 | |

| Surface # | 6 | 7 | 8 | 9 |
|---|---|---|---|---|
| k = | −1.6921E+00 | −1.6580E+00 | −1.8860E+01 | −3.5662E+00 |
| A4 = | 2.5307E−01 | −1.7784E+00 | 7.5597E−01 | −1.3913E+00 |
| A6 = | 5.7831E+01 | 1.8810E+01 | −1.4736E+01 | 2.5323E+00 |
| A8 = | −6.1701E+02 | −1.2623E+02 | 7.2513E+01 | −1.1998E+00 |
| A10 = | 3.1171E+03 | 5.4323E+02 | −1.9159E+02 | −5.1466E+00 |
| A12 = | −8.2016E+03 | −9.8873E+02 | 2.5617E+02 | 8.4214E+00 |
| A14 = | 1.0339E+04 | 6.0142E+02 | −1.6301E+02 | −4.2941E+00 |
| A16 = | −4.9040E+03 | | 3.9268E+01 | 6.5551E−01 |

In the image capturing lens system according to the 9th embodiment, the definitions of these parameters shown in the following table are the same as those stated in the 1st embodiment with corresponding values for the 9th embodiment. Moreover, these parameters can be calculated from Table 17 and Table 18 as the following values and satisfy the following conditions:

| 9th Embodiment | | | |
|---|---|---|---|
| f [mm] | 1.08 | (R3 + R4)/(R3 − R4) | 0.86 |
| Fno | 2.45 | 1/|tan(FOV)| | 0.04 |
| HFOV [deg.] | 43.8 | f/R4 | 0.64 |
| (V1 + V3)/(V2 + V4) | 2.35 | (T12 + T23 + T34)/Td | 0.14 |

-continued

| 9th Embodiment | | | |
|---|---|---|---|
| Td [mm] | 1.32 | CTmin [mm] | 0.15 |
| TL/ImgH | 1.86 | R5/R6 | 1.48 |
| R2/f | −0.56 | N4 | 1.63 |

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens system comprising, in order from an object side to an image side:
   a first lens element with positive refractive power having a convex image-side surface in a paraxial region thereof;
   a second lens element having negative refractive power;
   a third lens element with positive refractive power having a concave object-side surface in a paraxial region thereof and a convex image-side surface in a paraxial region thereof; and
   a fourth lens element with refractive power having a concave image-side surface in a paraxial region thereof, wherein an object-side surface and the image-side surface of the fourth lens element are aspheric, and the image-side surface of the fourth lens element has at least one convex shape in an off-axis region thereof;
   wherein the image capturing lens system has a total of four lens elements with refractive power, an Abbe number of the first lens element is V1, an Abbe number of the third lens element is V3, an Abbe number of the second lens element is V2, an Abbe number of the fourth lens element is V4, an axial distance between the object-side surface of the first lens element and the image-side surface of the fourth lens element is Td, an axial distance between the object-side surface of the first lens element and an image plane is TL, a maximum image height of the image capturing lens system is ImgH, and the following conditions are satisfied:

$1.75<(V1+V3)/(V2+V4)<3.5;$ $0.50 \text{ mm} < Td < 1.90 \text{ mm};$ and $TL/ImgH<2.75.$ 2. The image capturing lens system of claim 1, wherein the fourth lens element has the object-side surface being convex in a paraxial region thereof.

3. The image capturing lens system of claim 2, wherein a curvature radius of the object-side surface of the third lens element is R5, a curvature radius of the image-side surface of the third lens element is R6, and the following condition is satisfied:

$1.0<R5/R6<2.65.$

4. The image capturing lens system of claim 2, wherein the Abbe number of the first lens element is V1, the Abbe number of the third lens element is V3, the Abbe number of the second lens element is V2, the Abbe number of the fourth lens element is V4, and the following condition is satisfied:

$2.0<(V1+V3)/(V2+V4)<3.0.$

5. The image capturing lens system of claim 2, wherein a focal length of the image capturing lens system is f, a curvature radius of the image-side surface of the second lens element is R4, and the following condition is satisfied:

$f/R4<1.0.$

6. The image capturing lens system of claim 2, wherein a maximal field of view of the image capturing lens system is FOV, and the following condition is satisfied:

$1/|\tan(FOV)|<0.28.$

7. The image capturing lens system of claim 2, wherein a refractive index of the fourth lens element is N4, and the following condition is satisfied:

$1.60<N4<1.75.$

8. The image capturing lens system of claim 1, wherein the image-side surface of the second lens element has at least one convex shape in an off-axis region thereof.

9. The image capturing lens system of claim 8, wherein an axial distance between the first lens element and the second lens element is T12, an axial distance between the second lens element and the third lens element is T23, an axial distance between the third lens element and the fourth lens element is T34, the axial distance between the object-side surface of the first lens element and the image-side surface of the fourth lens element is Td, and the following condition is satisfied:

$0.02<(T12+T23+T34)/Td<0.20.$

10. The image capturing lens system of claim 8, wherein the second lens element has the image-side surface being concave in a paraxial region thereof.

11. The image capturing lens system of claim 8, wherein a curvature radius of the image-side surface of the first lens element is R2, a focal length of the image capturing lens system is f, and the following condition is satisfied:

$-1.75<R2/f<0.$

12. The image capturing lens system of claim 8, wherein a minimum central thickness of a lens element among the first lens element, the second lens element, the third lens element and the fourth lens element of the image capturing lens system is CTmin, and the following condition is satisfied:

$0.1 \text{ mm}<CTmin<0.25 \text{ mm}.$

13. The image capturing lens system of claim 8, wherein the fourth lens element has negative refractive power.

14. The image capturing lens system of claim 8, wherein the second lens element has a concave object-side surface in a paraxial region thereof.

15. The image capturing lens system of claim 1, wherein the axial distance between the object-side surface of the first lens element and the image-side surface of the fourth lens element is Td, and the following condition is satisfied:

$0.80 \text{ mm}<Td<1.65 \text{ mm}.$

16. An imaging device, comprising:
   the image capturing lens system according to claim 1; and
   an image sensor, wherein the image sensor is disposed on an image plane of the image capturing lens system.

17. A mobile terminal, comprising:
the imaging device according to claim 16.

18. An image capturing lens system comprising, in order from an object side to an image side:
- a first lens element with positive refractive power having a convex image-side surface in a paraxial region thereof;
- a second lens element with negative refractive power having a concave object-side surface in a paraxial region thereof;
- a third lens element with positive refractive power having a concave object-side surface in a paraxial region thereof and a convex image-side surface in a paraxial region thereof; and
- a fourth lens element with refractive power having a concave image-side surface in a paraxial region thereof, wherein an object-side surface and the image-side surface of the fourth lens element are aspheric, and the image-side surface of the fourth lens element has at least one convex shape in an off-axis region thereof;
- wherein the image capturing lens system has a total of four lens elements with refractive power, an Abbe number of the first lens element is V1, an Abbe number of the third lens element is V3, an Abbe number of the second lens element is V2, an Abbe number of the fourth lens element is V4, an axial distance between the object-side surface of the first lens element and the image-side surface of the fourth lens element is Td, a curvature radius of the object-side surface of the second lens element is R3, a curvature radius of the image-side surface of the second lens element is R4, and the following conditions are satisfied:

$1.75 < (V1+V3)/(V2+V4) < 3.5;$ $0.50 \text{ mm} < Td < 1.90 \text{ mm};$ and $(R3+R4)/(R3-R4) < 0.9.$ 19. The image capturing lens system of claim 18, wherein a maximum image height of the image capturing lens system is ImgH, an axial distance between the object-side surface of the first lens element and an image plane is TL, and the following condition is satisfied:

$TL/ImgH < 2.4.$

20. The image capturing lens system of claim 18, wherein the Abbe number of the first lens element is V1, the Abbe number of the third lens element is V3, the Abbe number of the second lens element is V2, the Abbe number of the fourth lens element is V4, and the following condition is satisfied:

$2.0 < (V1+V3)/(V2+V4) < 3.0.$

21. The image capturing lens system of claim 18, wherein the image-side surface of the second lens element has at least one convex shape in an off-axis region thereof.

22. The image capturing lens system of claim 18, wherein the fourth lens element has negative refractive power and the object-side surface thereof being convex in a paraxial region thereof.

23. The image capturing lens system of claim 18, wherein a maximal field of view of the image capturing lens system is FOV, and the following condition is satisfied:

$1/|\tan(FOV)| < 0.28.$

* * * * *